(12) United States Patent
Wipperfürth

(10) Patent No.: US 11,580,941 B2
(45) Date of Patent: Feb. 14, 2023

(54) MUSIC COMPILATION SYSTEMS AND RELATED METHODS

(71) Applicant: Dial House, LLC, San Francisco, CA (US)

(72) Inventor: Alex Wipperfürth, San Francisco, CA (US)

(73) Assignee: Dial House, LLC, San Francisco, CA (US)

( * ) Notice: Subject to any disclaimer, the term of this patent is extended or adjusted under 35 U.S.C. 154(b) by 351 days.

(21) Appl. No.: 16/516,061

(22) Filed: Jul. 18, 2019

(65) Prior Publication Data

US 2019/0341010 A1     Nov. 7, 2019

Related U.S. Application Data

(63) Continuation-in-part of application No. 16/390,931, filed on Apr. 22, 2019.

(60) Provisional application No. 62/661,982, filed on Apr. 24, 2018.

(51) Int. Cl.
   *G06F 3/0481*     (2022.01)
   *G10H 1/00*     (2006.01)
   *G06F 3/16*     (2006.01)

(52) U.S. Cl.
CPC ......... *G10H 1/0008* (2013.01); *G06F 3/0481* (2013.01); *G06F 3/165* (2013.01); *G10H 2210/036* (2013.01); *G10H 2210/061* (2013.01); *G10H 2210/066* (2013.01); *G10H 2210/076* (2013.01); *G10H 2210/081* (2013.01); *G10H 2210/125* (2013.01); *G10H 2240/131* (2013.01)

(58) Field of Classification Search
CPC ................................ G06F 3/14; G06F 3/0481
USPC ............... 715/202, 772, 820; 704/9; 725/32
See application file for complete search history.

(56) References Cited

U.S. PATENT DOCUMENTS

| | | | |
|---|---|---|---|
| 9,270,964 B1 * | 2/2016 | Tseytlin | G11B 27/031 |
| 10,838,686 B2 | 11/2020 | Kovacevic | |
| 10,897,650 B2 | 1/2021 | el Kaliouby et al. | |
| 10,911,829 B2 | 2/2021 | el Kaliouby et al. | |
| 2007/0067297 A1 * | 3/2007 | Kublickis | G06Q 20/29 |
| 2009/0178003 A1 * | 7/2009 | Fiedler | G06Q 30/0601 |
| | | | 715/810 |
| 2009/0292528 A1 * | 11/2009 | Kameyama | G10L 13/00 |
| | | | 704/9 |

(Continued)

*Primary Examiner* — Ruay Ho
(74) *Attorney, Agent, or Firm* — David R. Stevens; Stevens Law Group

(57) ABSTRACT

Music compilation methods disclosed herein include providing a database. Data is stored therein associating a user with access credentials for a plurality of music streaming services. A first server is communicatively coupled with the database and with multiple third party servers each of which includes a music library associated with the user. A list is stored in the database listing audio tracks of the libraries. A play selector is displayed on a user interface of a computing device communicatively coupled with the first server. User selection of the play selector initiates playback of a sample set, the sample set including portions of audio tracks in the list. The sample set is determined based on contextual information gathered by the computing device, the contextual information not including any user selection. Music compilation systems disclosed herein include systems configured to carry out the music compilation methods.

20 Claims, 17 Drawing Sheets

(56) References Cited

U.S. PATENT DOCUMENTS

| | | | |
|---|---|---|---|
| 2010/0050064 A1* | 2/2010 | Liu | G06F 16/4393 |
| | | | 715/202 |
| 2012/0159535 A1* | 6/2012 | Gratton | H04N 21/47217 |
| | | | 725/32 |
| 2017/0289202 A1* | 10/2017 | Krasadakis | H04L 65/60 |
| 2018/0307504 A1* | 10/2018 | Aggarwal | G10L 15/1822 |
| 2019/0087707 A1* | 3/2019 | Cummins | G06N 5/04 |
| 2019/0171666 A1* | 6/2019 | McKenzie | G06F 16/638 |
| 2020/0013380 A1* | 1/2020 | Kakoyiannis | G06F 16/686 |

* cited by examiner

| Tempo | Approachability | Engagement | Sentiment |
|---|---|---|---|
| Beats Per Minute | Chord Progression | Dynamics | Chord Type |
| | Time Signature | Pan Effect | Chord Progression |
| | Genre | Harmony Complexity | Lyric Content |
| | Motion of Melody | Vocabulary Range | |
| | Complexity of Texture | Word Count | |
| | Instrument Composition | | |

| I | IV | V |
|---|----|---|
| C | F  | G |
| D | G  | A |
| F | Bb | C |
| G | C  | D |
| A | D  | E |

| I | vi  | IV | V |
|---|-----|----|---|
| C | Am  | F  | G |
| D | Bm  | G  | A |
| F | Dm  | Bb | C |
| G | Em  | C  | D |
| A | F#m | D  | E |

| ii  | V  | I     |
|-----|----|-------|
| Dm7 | G7 | Cmaj7 |
| Em7 | A7 | Dmaj7 |
| Gm7 | C7 | Fmaj7 |
| Am7 | D7 | Gmaj7 |
| Bm7 | E7 | Amaj7 |

| I | vi  | ii | V |
|---|-----|----|---|
| C | Am  | Dm | G |
| D | Bm  | Em | A |
| F | Dm  | Gm | C |
| G | Em  | Am | D |
| A | F#m | Bm | E |

| I | V | vi  | IV |
|---|---|-----|----|
| C | G | Am  | F  |
| D | A | Bm  | G  |
| F | C | Dm  | Bb |
| G | D | Em  | C  |
| A | E | F#m | D  |

| I | IV | vi  | V |
|---|----|-----|---|
| C | F  | Am  | G |
| D | G  | Bm  | A |
| F | Bb | Dm  | C |
| G | C  | Em  | D |
| A | D  | F#m | E |

| I | iii | IV | V |
|---|-----|----|---|
| C | Em  | F  | G |
| D | F#m | G  | A |
| F | Am  | Bb | C |
| G | Bm  | C  | D |
| A | C#m | D  | E |

| I | IV | I | V |
|---|----|---|---|
| C | F  | C | G |
| D | G  | D | A |
| F | Bb | F | C |
| G | C  | G | D |
| A | D  | A | E |

| I | IV | ii | V |
|---|----|----|---|
| C | F  | Dm | G |
| D | G  | Em | A |
| F | Bb | Gm | C |
| G | C  | Am | D |
| A | D  | Bm | E |

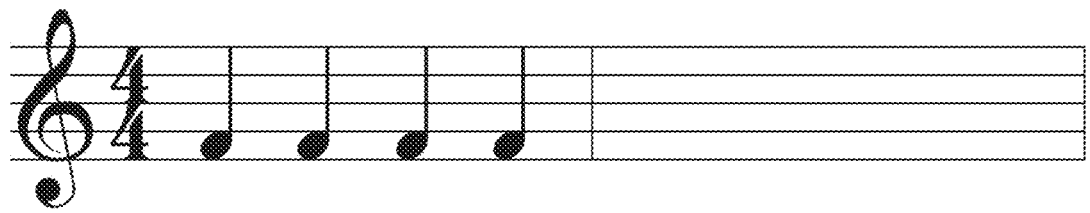
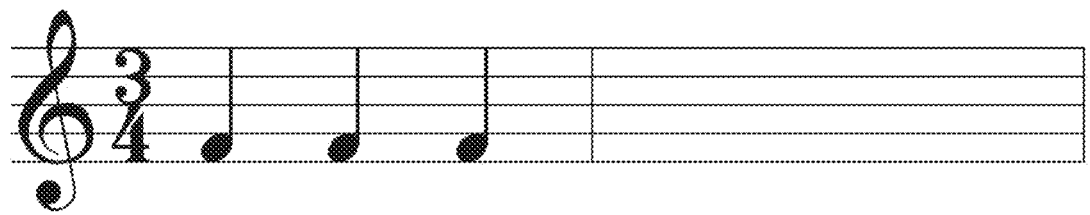
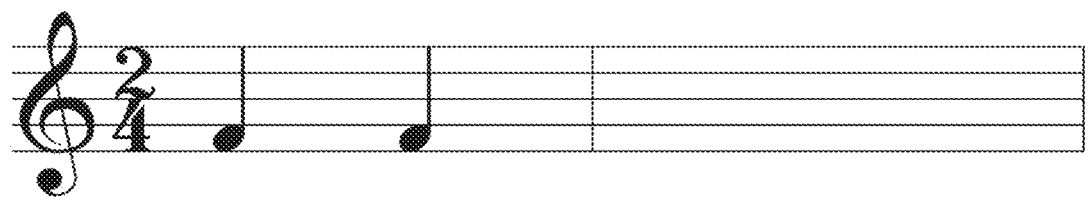
600
FIG. 6

| Traditional Genres | Streaming Service Genres | Context-befitting Genres |
|---|---|---|
| Rock | Chill | Commuting to Work |
| Hip-Hop | Finger Style | Exercising at Gym |
| Classical | Nerdcore | Cleaning the House |
| Reggae | Spytrack | Creating at Art Studio |

MUSIC COMPILATION SYSTEMS AND RELATED METHODS

CROSS REFERENCE TO RELATED APPLICATIONS

This document is a continuation-in-part application of U.S. Nonprovisional patent application Ser. No. 16/390,931, entitled "Vehicle Systems and Interfaces and Related Methods," naming as first inventor Alex Wipperfürth, which was filed on Apr. 22, 2019, which in turn claims the benefit of the filing date of U.S. Provisional Patent Application No. 62/661,982, entitled "Supplemental In-Vehicle (Passenger and Lifestyle Focused) System and Interface," naming as first inventor Alex Wipperfürth, which was filed on Apr. 24, 2018, the disclosures of each of which are incorporated entirely herein by reference, and each of which are referred to hereinafter as "Parent applications."

BACKGROUND

1. Technical Field

Aspects of this document relate generally to systems and methods for music compilation and playback.

2. Background Art

Various musical compilation systems exist in the art. Some of these utilize mobile device applications and/or website interfaces for allowing a user to stream music which is stored in a remote database or server. Some existing systems allow a user to download music in addition to streaming. Traditional methods of determining which songs to include in a compilation include selecting based on musical genre and/or similarities between the songs themselves.

SUMMARY

Embodiments of music compilation systems may include: one or more first databases; data stored in the one or more first databases associating a user with access credentials for a plurality of third party music streaming services; one or more first servers communicatively coupled with the one or more first databases, the one or more first servers also communicatively coupled with a plurality of third party servers through a telecommunication network, each of the third party servers providing access to a music library associated with the user, each of the third party servers associated with one of the third party music streaming services; a list stored in the one or more first databases listing audio tracks of the music libraries of the third party servers; a computing device communicatively coupled with the one or more first servers through the telecommunication network; and one or more user interfaces displayed on the computing device, the one or more user interfaces including: a play selector configured to, in response to receiving a user selection of a Play selector without any other selections, initiate play of a sample set using the computing device, wherein the sample set includes portions of the audio tracks in the list; wherein the system determines the portions of the audio tracks in the sample set based on contextual information gathered by the computing device, the contextual information not comprising any user selection.

Embodiments of music compilation systems may include one or more or all of the following:

The sample set may include multiple partial audio tracks each of which is only a portion of a full audio track.

The one or more first servers may be configured to determine, based on the contextual information, one or more of the following: a type of location in which the sample set is being played; a condition of the location; a purpose of an occasion for which the sample set is being played; a social dynamic at the location; a state of mind of the user; a regularity of the occasion; and a time frame.

The list may categorize each audio track according to one or more of the following criteria: a tempo; an approachability; an engagement; and a sentiment.

The tempo may be defined as beats per minute; the approachability may be defined by one or more of chord progression, time signature, genre, motion of melody, complexity of texture, and instrument composition; the engagement may be defined by one or more of dynamics, pan effect, harmony complexity, vocabulary range, and word count; and the sentiment may be defined by one or more of chord type, chord progression, and lyric content.

The system may be configured to, in response to receiving the user selection of the play selector, automatically mix audio tracks by transitioning from a first audio track to a second audio track at portions of the two audio tracks that are similar in one or more of harmony, tempo and beat.

The system may be configured to automatically mix the audio tracks based on a determination made by the system of which portions of the two audio tracks are most similar in one or more of harmony, tempo and beat.

The system may determine, in response to the user selection of the play selector, a playback time for the sample set, wherein the playback time is not selected by the user but is based on the contextual information, if available.

The system may be configured to repeatedly gather the contextual information using the computing device and, without receiving any user selection, modify the sample set based on a change in the contextual information.

Embodiments of music compilation methods may include: providing one or more first databases; associating, in the one or more first databases, a user with a plurality of third party music streaming services; providing one or more first servers communicatively coupled with the one or more first databases, the one or more first servers also communicatively coupled with a plurality of third party servers through a telecommunication network, each of the third party servers providing access to a music library associated with the user, each of the third party servers associated with one of the third party music streaming services; storing a list in the one or more first databases listing audio tracks of the music libraries of the third party servers; displaying a play selector on a user interface of a computing device communicatively coupled with the one or more first servers through the telecommunication network; in response to receiving a user selection of the play selector, initiating play of a sample set using the computing device, wherein the sample set includes portions of the audio tracks in the list; wherein the sample set is determined based on contextual information gathered by the computing device, the contextual information not including any user selection.

Embodiments of music compilation methods may include one or more or all of the following:

The sample set may include only partial audio tracks each of which is only a portion of a full audio track.

The method may include determining, using the one or more first servers, based on the contextual information, one or more of the following: a type of location in which the sample set is being played; a condition of the location; a purpose of an occasion for which the sample set is being played; a social dynamic at the location; a state of mind of the user; a regularity of the occasion; and a time frame.

The method may further include displaying, on a user interface of the computing device, contextual determinations based on the contextual information, and displaying one or more selectors thereon allowing a user to modify the contextual determinations.

The method may further include, using the one or more first servers, categorizing each audio track according to one or more of the following criteria: a tempo; an approachability; an engagement; and a sentiment.

The method may further include, in response to receiving the user selection of the play selector, automatically mixing audio tracks by transitioning from a first audio track to a second audio track at portions of the two audio tracks that are similar in one or more of harmony, tempo and beat.

The method may further include displaying an off selector on a user interface of the computing device and, in response to receiving a user selection of the off selector, ceasing from gathering the contextual information by the computing device and ceasing from determining the sample set based on the contextual information.

The method may further include displaying a do-not-play selector on a user interface of the computing device allowing the user to make one or more selections to prevent one or more audio tracks or styles in the list from being included in the sample set.

The method may further include analyzing the music libraries of the user using the one or more first servers and storing in the one or more first databases, based on the analysis, one or more music preferences of the user, wherein the sample set is determined at least in part based on the one or more music preferences.

The method may further include displaying, on a user interface of the computing device: audio track details of the sample set; a save selector allowing the user to save the sample set; and a share selector allowing the user to share the sample set.

Embodiments of music compilation methods may include: providing one or more databases; providing one or more servers communicatively coupled with the one or more databases; storing, in the one or more databases, a list of audio tracks; associating, through the one or more databases, a user with the list of audio tracks; in response to receiving a user selection of a play selector through a user interface of a computing device communicatively coupled with the one or more servers through a telecommunication network, initiating play of a sample set using the computing device, wherein the sample set includes portions of the audio tracks in the list; wherein the sample set is determined based on contextual information gathered by the computing device, the contextual information not including any user selection; and wherein the sample set includes multiple partial audio tracks each of which is only a portion of a full audio track.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 4 is a table representatively illustrating other elements of the example music compilation method of FIG. 2;

FIG. 5 is a set of tables representatively illustrating other elements of the example music compilation method of FIG. 2;

FIG. 6 is a diagram representatively illustrating other elements of the example music compilation method of FIG. 2;

FIG. 8 is a table representatively illustrating other elements of the example music compilation method of FIG. 2;

DESCRIPTION

Implementations/embodiments disclosed herein (including those not expressly discussed in detail) are not limited to the particular components or procedures described herein. Additional or alternative components, assembly procedures, and/or methods of use consistent with the intended music compilation systems and related methods may be utilized in any implementation. This may include any materials, components, sub-components, methods, sub-methods, steps, and so forth.

Figure 1:
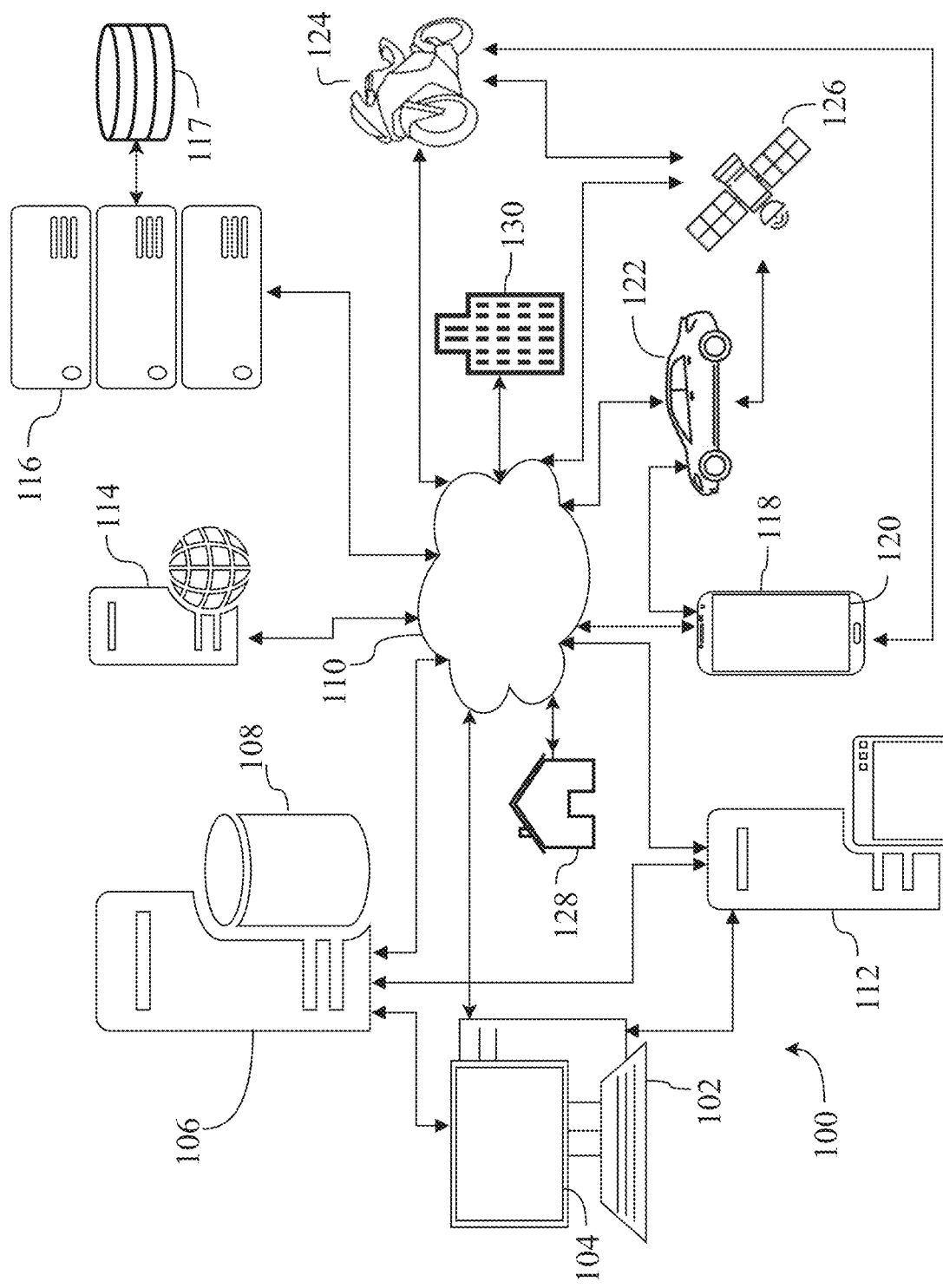
FIG. 1 is a diagram view of an implementation of a music compilation system.

Referring now to FIG. 1, a representative implementation of a music compilation system (system) 100 is shown. Other music compilation systems may include additional elements and/or may exclude some elements of system 100, but some representative example elements of system 100 are shown. Computing device (device) 102 includes a display 104 through which an administrator may access various elements of the system using a variety of user interfaces. Device 102 is seen communicatively coupled with a database server (DB server) 106 which in turn is communicatively coupled with a database (DB) 108. The administrator may configure one or more databases and one or more database servers for storing various data used in conjunction with the methods disclosed herein.

The administrator device 102 may be directly communicatively coupled with the database server or could be coupled thereto through a telecommunications network 110 such as, by non-limiting example, the Internet. The admin and/or travelers (end users) could access elements of the system through one or more software applications on a computer, smart phone (such as device 118 having display 120), tablet, and so forth, such as through one or more application servers 112. The admin and/or end users could also access elements of the system through one or more websites, such as through one or more web servers 114. The system also communicates with third party servers 116 (which in turn may be in communication with third party databases 117) to implement the music compilation. One or more off-site or remote/cloud servers/databases could be used for any of the server and/or storage elements of the system.

In implementations one or more vehicles may be communicatively coupled with other elements of the system, such as vehicles 122 and 124. Vehicle 122 is illustrated as a car and vehicle 124 as a motorcycle but representatively illustrate that any vehicle (car, truck, SUV, van, motorcycle, etc.) could be used with the system so long as the vehicle has communicative abilities through the telecommunications network through which a traveler may access elements of the system. For example, the vehicle may have a BLUETOOTH connectivity with device 118, and through this connectivity any of the vehicle's sensors, such as temperature, global positioning satellite (GPS), and so forth, may be used by the system to implement music compilation methods. Additionally, if the vehicle has connectivity with the Internet, the device 118 may communicate with any other elements of the system through the vehicle's connection. This could be useful, by non-limiting example, when a driver is in a location without cell phone tower coverage but the vehicle still has connectivity to the Internet, such as through satellite communications. A representative satellite 126 is shown communicatively coupled with the vehicles, although the satellite may rightly be understood to be comprised in the telecommunications network 110—the standalone satellite is shown only to emphasize that the vehicles may communicate with the system even when in a place without access to Wi-Fi and/or cell towers (and when in proximity of Wi-Fi and/or cell towers may also communicate through Wi-Fi and cellular networks) and, as indicated above, the device 118 may utilize this connectivity in order to implement music compilation methods. System 100 also shows a home 128 and an office 130 communicatively coupled with the system through the telecommunications network. These are meant to represent that the system may use inputs from these locations (for example smart appliances, smart thermostats, smart speakers, and so forth) in the home, at an office, at a school, at a gym, and at any other location to inform the system in determining a proper music compilation in any given situation.

The system 100 is illustrated in an intentionally simplified manner and only as a representative example. One or more of the servers, databases, etc. could be combined onto a single computing device for a very simplified version of system 100, and on the other hand the system may be scaled up by including any number of each type of server and other element so that the system may easily serve thousands, millions, and even billions of concurrent users. While only one device 118 is shown, in some implementations there would normally be many devices 118 accessing the system and implementing the methods simultaneously, with the number of databases, servers, computing devices, and the like scaled up to accommodate the number of users.

The system may, after receiving permission using device 118 when installing a software application to implement music compilation, access the user's online calendar application, which may be useful to help know how to compile the music. For example the system may at one point determine, using the user's third party calendar, that the user is driving to an important meeting with a coworker, and at another point may determine that the user is having dinner at home with a friend, and may use this information to tailor different music compilations appropriate for each setting.

The system may also, with the user's permission, access the user's PANDORA music profile, the user's SPOTIFY profile, and any number of other music streaming service profiles to help implement the music compilation by providing music, listening history, preferences, and other profile information from those applications. User login information for third party music applications (and any other third party software applications) may be stored in the database(s) so that the system may access the third party applications using the user's profile to provide the music compilation services. SONOS is an example of an existing system/method which allows playback from multiple existing streaming audio accounts, though without many of the features described herein with respect to the disclosed systems/methods.

Figure 17:
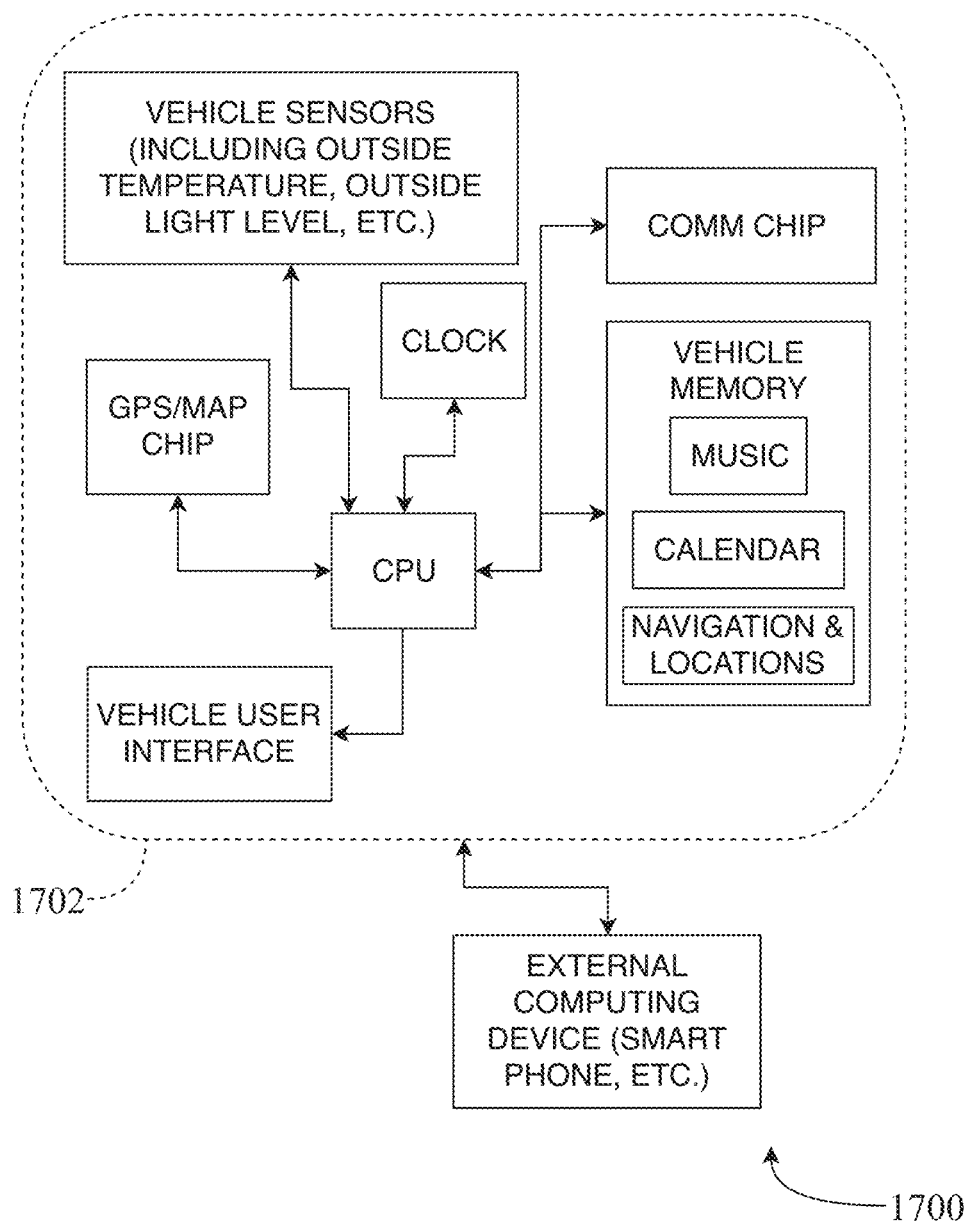
FIG. 17 representatively illustrates a vehicle system which may be accessed and/or utilized by the system of FIG. 1 to implement music compilation.

When the user is in a vehicle, the system may also access a vehicle memory and or other elements. FIG. 17 includes a block diagram (diagram) 1700 representatively illustrating a vehicle system 1702 communicatively coupled with an external computing device, which may be device 118 by non-limiting example. The vehicle system is seen to include a processor (CPU), a user interface, a GPS/MAP chip, a communications (COMM) chip, and vehicle memory. It can be seen that some music files, navigation history and stored locations are stored in the vehicle memory, and that the vehicle has a built-in calendar (which may in turn be syncing from the user's third party calendar such as a Samsung Calendar or the like). The CPU is also seen to be communicatively coupled with vehicle sensors, including outside temperature sensors, ambient light sensors, biometric sensors, and other sensors. The CPU is also coupled with a clock which may obtain time information from satellites and the like. The ability of the system to access the vehicle elements may at times be useful to help compile a proper music compilation.

For example, from the vehicle system may be gathered (by communication of the device 118 with the vehicle system 1702, such as via a BLUETOOTH or other connection) that it is chilly and snowing outside and that there is low light (through vehicle sensors), that the user is on a mountainous backroad (through the GPS/MAP chip), that the user is driving an SUV with the four-wheel drive enabled (through the vehicle sensors and/or memory), and that the user is heading to a cabin for the weekend with family (through the calendar). This information could all inform the system 100 in compiling an appropriate music compilation which takes into account the need of the user to drive slowly and carefully, due to the weather and road conditions, but also help the user and passengers to wind down for a relaxing weekend. The music compilation could include some music that is stored in the vehicle memory as well as other music that is streamed from third party applications.

The above vehicle-based example is only one example, as the system 100 may be used to compile music in any non-driving setting, and in such implementations there may be no vehicle involved and accordingly no vehicle system involved. But the above is only given as a representative example of how, when the user is in a vehicle, the system may utilize the vehicle system 1702 to further inform the music compilation. Additionally, when the user is in a vehicle the system 100 may play the music compilation through the vehicle's sound system (and/or display the music details on the vehicle user interface), such as by communicating the data from the device 118 to the vehicle system through a wireless or wired connection.

In implementations the system 100 implements the music compilation in a way that it is noticeably different from conventional music streaming services, so that the music compilation is a DJ-like compilation. This may return music listening in the vehicle to something more like an art form. In implementations the music compilation could be prepared for a specific trip (or in other words the system selects songs and portions of songs for a soundtrack based on the details of a specific drive). The system may adaptively mix music tracks and partial music tracks in a way that adjusts to the nature and details of the trip, instead of playing music tracks in a linear, sequential yet random fashion as with conventional music streaming services. The system may implement music compilation by mixing tracks and partial tracks that are determined by the system to be appropriate for the current trip, the current stage of the trip, and so forth.

But, as indicated above, the system and methods disclosed herein are not only for trips, and not only for driving. The system and methods may be used to mix music tracks and/or partial tracks of third party catalogs in an adaptive manner based on the particular listening occasion, in any type of setting. For instance, the system and method could be used in an art studio setting, playing background music for the artists, while they create their art. The mixing may be done in a professional, DJ-like manner so that the sequence of tracks and/or partial tracks appear as one continuous and seamless track.

Figure 2:
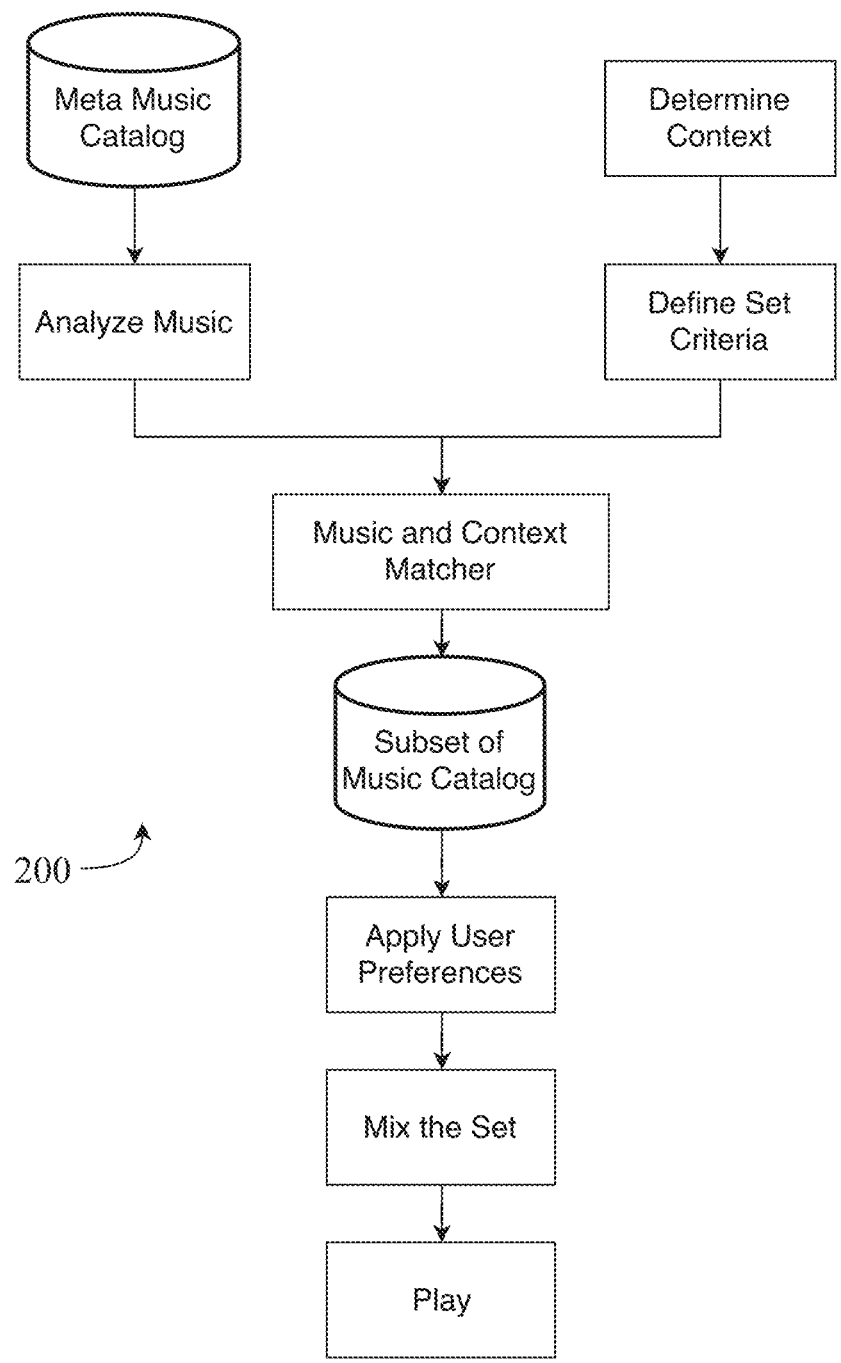
FIG. 2 is a flow diagram representatively illustrating elements of an example music compilation method implemented using the system of FIG. 1.

Referring now to FIG. 2, block diagram (diagram) 200 representatively illustrates details of the system 100 and music compilation methods. As discussed briefly above, in implementations the system and method utilizes third-party music streaming services and personal music libraries, such as by accessing the user's music catalogs (such as from servers of the system 100 accessing third party servers 116) using third party application program interfaces (APIs). For example, referring back to FIG. 1, the system may communicate with one or more SPOTIFY servers (third party servers 116) which in turn communicate with SPOTIFY databases (third party databases 117). The communication of the system 100 with the third party servers may be done using the third party's API. Using such communication the system may obtain details of the user's SPOTIFY music catalog and playlists, which could include for example which stations the user has set up, which tracks the user has given a "thumbs up" to, which tracks the user has given a "thumbs down" to, a list of recently played tracks, and so forth. The information for the tracks could include artist, song, album, album artwork, and so forth. The system may store all or some of this information in the database(s) 108. The user login credentials for the SPOTIFY service may have previously been stored in the database through a user interface (such as on a mobile device app).

The system 100 in implementations may not store the actual music files themselves, but may simply stream some or all of them from the third party music application. For example, if the user is a paid or premium user of SPOTIFY the user can select and play any song on demand, and the system 100 can use this ability in behalf of the user to select and play a series of songs. But in implementations third party music applications do allow downloading of music for offline playing, and in implementations the system 100 may download the tracks selected for a compiled set of music (and in some implementations may delete them later, so that they are only stored temporarily to implement the set). The downloading of the tracks may in implementations allow the system to more easily transition from one track to another using DJ-like effects, which will be discussed hereafter. However, in implementations a music streaming service without download privileges may still allow loading of multiple songs to transitory storage ahead of time, and based on this functionality the system 100 may still be able to transition tracks with DJ-like effects.

The above example of a SPOTIFY library is given, but the user may have a catalog for any number of music streaming services, such as SHAZAM, PANDORA, IHEARTRADIO, LIVEXLIVE, TUNEIN, SOUND CLOUD, GOOGLE PLAY MUSIC, MUSI, PLAYLIST, 8TRACKS, SPINRILLA, APPLE MUSIC, SIRIUS XM, TIDAL, AMAZON MUSIC, NAPSTER, DEEZER, and so forth. The system 100 may, using the user's login credentials and/or permissions as supplied by the user, access catalogs and profile information for all of the user's streaming music services. Similarly, any songs that the user actually owns, such as a library of purchased songs available through APPLE MUSIC, GOOGLE PLAY MUSIC, AMAZON MUSIC, or songs owned and downloaded to the device 118 through any service, may be used by the system 100 to determine a meta music catalog, as indicated on FIG. 2. As previously stated, this collection of songs may indicate simply the details about the songs, such as artist, album, and song title, album art, and so forth, but may in implementations not include the music files themselves. The meta music catalog is therefore a collection of information about the user's music listening, including individual songs listened to, songs liked, songs disliked, etc., from various streaming services and downloaded music files.

FIG. 2 shows an analyze music step. In order to compile music sets, all songs within the meta music catalog are analyzed, categorized and indexed according to a proprietary music analysis algorithm which identifies each song's tempo, approachability, engagement, and sentiment. This index may be stored in the database and associated with the specific user through the database. In parallel, sensors and applications communicating with the system 100 (such as calendar and navigation applications on the device 118 to which the user has allowed system 100 to access) and other information allow the system 100 to determine the specific context or occasion for the music listening experience. The identification of the context allows the system to determine requirements for the music mix set to be compiled. In other words, the context determines the criteria for the appropriate music to be mixed. As such, the criteria change with each particular context.

The defined music set criteria and analysis information related to the meta music catalog are then matched to filter the meta music catalog and collect only the qualifying songs that match the criteria for the specific listening occasion. In this way, a "set catalog" is formed (shown in FIG. 2 as "subset of music catalog"). The set catalog can be further filtered by user preferences. For instance, there may be certain genres or artists that should not be played (either never, or only during certain occasions: e.g., "do not play punk music when my wife is in the car"). These preferences then further limit the set catalog. This is shown in FIG. 2 by the "apply user preferences" step. A virtual DJ "turntabler" engine then configures the seamless mix-set that takes into account a possible time frame and vibe progression. In implementations all the user has to do is select a "play" selector (for example the play selector representatively illustrated in FIG. 13) and the set will automatically begin without further commands.

With regards to the meta music catalog, the system may use various music libraries to create mixes that retain the nuanced skills and rules to make a befitting soundtrack for each particular situation. Two existing examples of music libraries are: a personal library that may be locally stored to a device and a library from a music streaming service such as SPOTIFY. Unlike other existing services such as the SONOS application, which lists and provides access to individual libraries, but does not actually aggregate music libraries, the system 100 combines the user's available libraries into one meta music library from which to create mixes. This approach deliberately foregoes a direct relationship with the music industry, and instead utilizes the APIs of streaming services and access to personal libraries. And instead of simply playing songs from third party catalogs, the system 100 modifies and mixes each song, thereby creating a distinctive, new music listening experience. In a sense, the system 100 is creating a new music format: the automated radio mix-set.

Music Analysis and Indexing

With respect to the music analysis and indexing, the music industry analyzes songs either artistically by academic musicologists or for advertising-related purposes, by genre or mood. Neither method prioritizes the listener, who approaches music very differently. In his seminal white paper "Perceived emotion and felt emotion: same or different," Professor Alf Gabrielsson distinguishes between emotion felt by the listener (the "internal locus of emotion") and the emotion music is expressing (the "external locus of emotion"). The system 100 approaches song analysis from a listener's perspective, understanding songs the way the music is experienced internally.

Referring to FIG. 4, table 400 representatively illustrates that the system classifies each song according to four criteria: its tempo (defined by its beats per minute), its approachability (defined by how accessible vs. challenging the song is to the listener), its engagement (meaning whether it is a lean forward or a lean backward song) and its sentiment (defined by the mood a song intends to create within the listener). A description of each of these analysis criteria is provided below.

Tempo

Beats per minute is the metric used to define the speed at which the music should be played (the tempo).

Approachability

Chord Progression—Common chord progressions are more familiar to the ear, and therefore more accessible to a wider audience—popular in genres like Rock and Pop. Genres such as Classical or Jazz tend to have more complex, a typical chord progressions and are more challenging. Tables 500 of FIG. 5 show a number of common chord progressions. The system and method could use any of these chord progressions, or other chord progressions, to categorize any given track along a spectrum of typical to a typical chord progression.

Time Signature—Time signature defines the beats per measure, as representatively illustrated in diagram 600 of FIG. 6. The most common and familiar time signature is 4/4, which makes it the most accessible. 3/4 is significantly less common (and therefore marginally more challenging), but still relatively familiar, as heard in songs such as Bob Dylan's "The Times They Are A-Changin." Uncommon time signatures such as 5/4 (e.g., Dave Brubeck's "Take Five") are more challenging as they are more complex and engaging than traditional time signatures. Also worth nothing is that songs can have varying time signatures. As a non-limiting example, THE BEATLES' "Heavy" is 4/4 in the verses and % in the chorus. FIG. 6 only representatively illustrates the 4/4, 3/4, and 2/4 time signatures, but the system and method may determine and assess approachability according to any time signature, including by non-limiting examples: simple (e.g., 3/4 and 4/4); compound (e.g., 9/8 and 12/8); complex (e.g., 8/4 or 7/8), mixed (e.g., 5/8 & 3/8 or 6/8 & 3/4), additive (e.g., 3+2/8+3), fractional (e.g., 2½/4), irrational (e.g., 3/10 or 5/24), and so forth.

Genre—More popular and common genres of music such as Rock, R&B/Hip-Hop, Pop, and Country are more accessible. Less popular genres like Electronic Dance Music, Jazz, and Classical can be less familiar, and more challenging.

Figure 7:
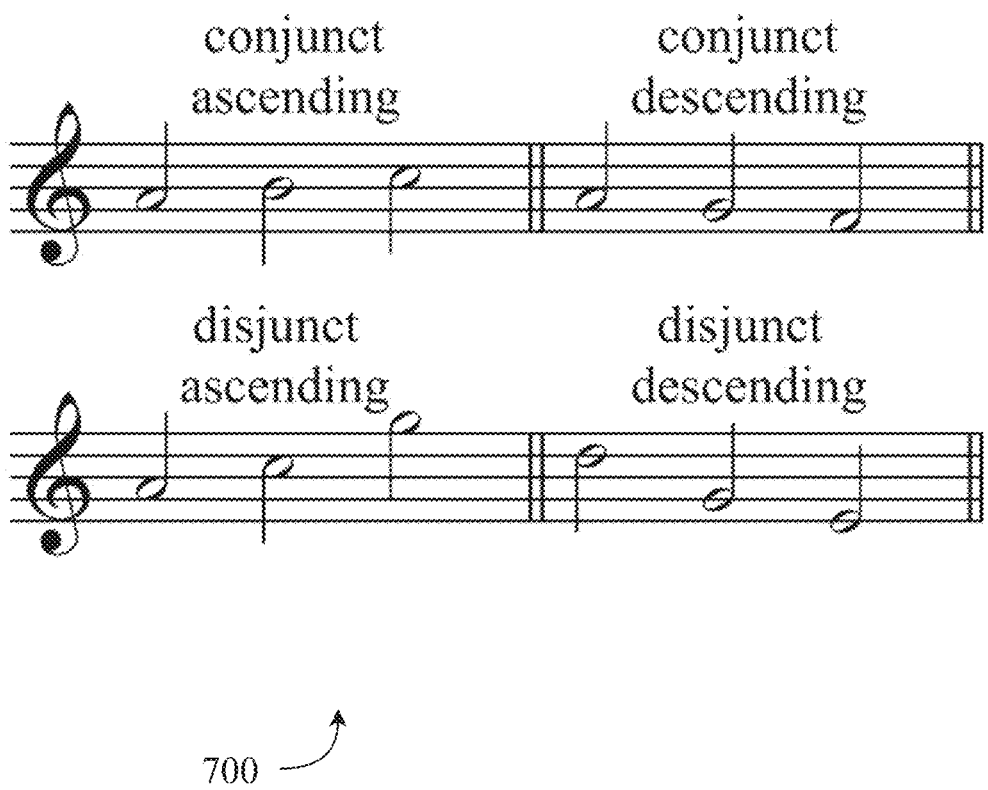
FIG. 7 is a diagram representatively illustrating other elements of the example music compilation method of FIG. 2.

Motion of Melody—Motion of Melody is a metric that defines the variances in a melody's pitch over multiple notes. This is representatively illustrated by diagram 700 of FIG. 7. Conjunct melody motions have less variance, are more predictable, and are therefore more accessible (i.e., more approachable), while distinct melody motions have a higher variance, are less predictable, and more challenging (and so less approachable).

Complexity of Texture—In music, texture is used to describe the range of which the tempo, melodies, and harmonics combine into a composition. For example, a composition with many different instruments playing different melodies—from the high-pitched flute to the low-pitched bass—will have a more complex texture. Generally, a higher texture complexity is more challenging (i.e., less approachable), while a lower texture complexity is more accessible—easier to digest for the listener (i.e., more approachable).

Instrument Composition—Songs that have unusual instrument compositions may be categorized as more challenging and less approachable. Songs that have less complex, more familiar instruments compositions may be categorized as less challenging and more approachable. An example of an accessible instrument composition would be the standard vocal, guitar, drums, and bass seen in many genres of popular music.

Engagement

Dynamics—Songs with varying volume and intensity throughout may be categorized as more lean-forward, while songs without much variance in their volume and intensity may be categorized as more lean-backwards.

Pan Effect—An example of a pan effect is when the vocals of a track are played in the left speaker, while the instruments is played in the right speaker. Pan effects can give music a uniquely complex and engaging feel, such as THE BEATLES' "Because" (lean-forward). Songs with more or unique pan effects may be categorized as more lean-forward, while songs with standard or minimal pan effects are more familiar and may be categorized as more lean-backwards.

Harmony Complexity—Common vocal or instrumental harmonic intervals heard in popular music—such as the root, third, and fifth that make up a major chord—are more familiar and may be categorized as more lean-backwards. Uncommon harmonic intervals—such root, third, fifth and seventh that make up a dominant 7 chord—are more complex, uncommon, and engaging and may be categorized as more lean-forward. THE BEATLES' "Because" is an example of a song that achieves high engagement with complex, uncommon harmonies.

Vocabulary Range—Vocabulary range is generally a decent metric for the intellectual complexity of a song. A song that includes a typical, "difficult" words in its lyrics is more likely to be described as lean-forward—more intellectually engaging. A song with common words is more likely to be described as lean-backwards—less intellectually engaging.

Word Count—Word count is another signal for the complexity of the song. A higher word count can be more engaging (lean-forward), while a lower word count can be less engaging (lean-backwards).

Sentiment

Chord Type—Generally, minor chords are melancholy or associated with negative feelings (low sentiment) while major chords are more optimistic or associated with positive feelings (high sentiment).

Chord Progression—If a song goes from a major chord to a minor chord, it may be an indication that the sentiment is switching from high to low. If the chord progression goes from major to minor and back to major it may be an indication that the song is uplifting and of higher sentiment. Other chord progressions may be used by the system/method to help classify the sentiment of a song.

Lyric Content—A song that has many words associated with negativity (such as "sad," "tear(s)," "broken," etc.), may likely be of low sentiment. If a song has words associative with positivity (such as "love," "happy," etc. may more likely be of high sentiment.

Context Determination

Referring back to FIG. 2, The determine context step may be accomplished using a unique data collection, analysis, and management system. The innovative underlying belief related to system 100 is that every kind of listening occasion deserves its own experience. Therefore, the listening experience in implementations includes a design constraint: the experience is determined by the occasion and its specific qualities. Based on this philosophy, there are seven major context attributes that, in implementations, define a listening occasion, and are the categories that are used to determine set criteria based on predetermined conditions that are stored in the one or more databases.

Type of Space—Where is the user listening? In a car, in a public space like an art studio or at work? At home?

Space Conditions—How loud is the space? How many different people are talking? At what decibel level? What is the weather like? If the user is in a car, the attributes will be navigational in nature (e.g., How will the drive evolve? Will the type of road change, for instance from city to highway? Will there be traffic jams? Will there be toll roads? Etc.). For other spaces, like an art studio, the attributes will be situational in nature (e.g., How loud is the space? How many different people are talking? At what decibel level?).

Intent—What is the purpose of the occasion? For instance, in the car: Is it a commute, an errand, a trip to a meeting, a road trip? Or in an art studio: Is it a creative activity occasion, or a social event?

Social Dynamic—Is the listener alone, with friends, or with weak social connections? How many? The listening experience will in implementations be dramatically different depending on the social context.

State of Mind—Is the listener reflective? Frustrated? Does s/he need to reboot their brain?

Regularity of the occasion—Is the occasion part of a larger pattern? Is it a recurring, even regular event? Is there a time pattern to it? Are there certain behaviors associated with this particular occasion? Are routine choices being made?

Time Frame—Is there a length of time associated with the occasion or is it open-ended? If in the car, what is the trip duration? If an event, is at regularly recurring with clear beginning and end?

These unique context attributes have been selected based on years of structured studies of human behavior as it relates to music listening and similar activities. A database of possible scenarios, based on differences in these seven attributes, has been tested on hundreds of unique occasions and has proven to capture every possible scenario as long as these seven qualities are properly understood. Accordingly, the system 100 may, using stored scenarios (stored in the database) associated with various combinations of the seven attributes through the database, determine based on gathered information related to the seven attributes which scenario(s) apply.

Information provided by a phone, smart speaker (e.g., GALAXY HOME), connected home devices, application information (like geo-location), sensors and other information may be accumulated over time in order to assess the aforementioned qualities of context. This data input in implementations may be precise and manageable as it is derived only from concrete sources available at the location. For example, a car navigation app is already able to present the last destination entered, store destinations, and so on. The system in implementations determines the context by combining, tracking and analyzing the information gathered so that it can learn and adjust based on previous behavior and so that the same information can be used in other services, not only in the application from which it was sourced. In other words, the accumulated data collected may be shared among various applications and services instead of being isolated.

Each listening occasion may contain data from various sources including a phone, vehicle sensors, a navigation application, a vehicle infotainment system (including the speaker system), connected external devices (e.g., a laptop), and so on. The system in implementations synthesizes the information in order to make inferences about the qualities of context that define each occasion. Examples of how data can be derived for each of the seven attributes is given below.

Type of space can be determined via geolocation apps and/or by identifying the location of the speaker system (if apart from a mobile device) used to stream the music set.

Space attributes may be navigational (if in a vehicle) or situational. Navigational attributes may be derived from a vehicle's GPS system or from a mobile device's GPS system. Situational attributes can be derived via sensors and apps of a mobile device or vehicle. For instance, a decibel level of the space, and whether (singular or dialog) speech is present, and at what level, may be determined by microphones of a mobile device or vehicle.

Intent can be derived by analyzing the cumulative historical information collected by calendar entries and/or a navigation system (e.g., the number of times a particular location or destination was used, the times of day, as well as other accessible information). The navigation system could be a third party app on a mobile device and/or a navigation system of a vehicle.

The social dynamic can be deduced by the type of space, voice and face recognition sensors of a mobile device and/or vehicle, biometric sensors of a mobile device and/or vehicle, the infotainment selection or lack thereof, the types and quantity of Near Field Communication (NFC) objects recognized (e.g., office keycards) by a mobile device and/or vehicle system, and so on. For instance, if the listener uses the headphone jack of a mobile device (device 118), it may be determined to be a private listening situation. If the speaker system in a public venue is accessed, it may be determined to be social listening.

The space occupants' state of mind can be determined via biometric, voice, face and eye movement recognition sensors of a mobile device and/or vehicle system, the usage of a climate control system (e.g., heat) of a vehicle or building, and so on. For example, a driver of a vehicle may be in a bad mood (as determined by gripping the steering wheel harder than usual and their tone of voice, use of language, or use of climate control system) and may be accelerating too quickly or driving at a high speed.

The conditions can be sourced through apps (e.g., weather app) of a mobile device, temperature sensors of a mobile device or vehicle system, and/or other external sensors.

Regularity of the occasion can be determined through cumulative historical geo-positional data from a map application of a mobile device or vehicle system, calendar patterns of a calendar app of a mobile device or vehicle system, and which devices are communicatively coupled with the system near to a user's device 118 (for example this may be a regular outing with friends that repeats each week so that the friends' phones are in close proximity with the user's phone as determined by NFC information).

If there is a time frame, it may be determined through calendar entries of a calendar app of a mobile device or vehicle system, a navigational application of a mobile device or vehicle system, or regular patterns.

The system 100 performs the context determination by analyzing each data point relating to a particular occasion and providing direction for every music set. It remains flexible, so that it can adjust to changing conditions (e.g., during a drive, if the road changes from street driving to highway driving, there may be different requirements for the music attributes).

The system outputs a precise description of the situation to define the set criteria. This output in implementations has a brief handle, in implementations linked to the intent of the occasion to summarize it. For instance: commute to work; create at art studio; happy hour at work; relax at home With the concise handle comes additional information which informs whether it is private or social listening, whether the set will be open-ended or have a specific duration, whether it needs to be prepared to adapt to changing conditions, etc.

In implementations the context determination may be done by one or more software applications or executables of the system 100 which may be termed the Context Determiner.

Set Requirements

Once the context is identified, the corresponding music requirements can be determined. Only music that fits the criteria of the determined context (based on tempo, approachability, engagement, and sentiment) will be funneled into a narrow subset to be available to be mixed and played after the user preferences are applied.

It is pointed out again here that the music compilation of system 100 is internally listener-centric, rather than externally music industry-centric. That means that it is the context, rather than the general taste, popularity, or musicology attributes, that determines the type of music that qualifies for a particular set. For example, referring to FIG. 8, table 800 representatively illustrates that while traditional music genres might include categories like Rock, Hip-Hop, Classical and Reggae, and while streaming services might include categories like Chill, Finger Style, Nerdcore and Spytrack, the system 100 allows for unique context-specific genres such as Commute to Work, Exercising at Gym, Cleaning the House, Creating at Art Studio, and so forth.

Users tend to listen to different types of music depending on the context. For instance, a user will listen to different music when alone in the car on the way to work than when driving his/her 9-year old daughter to school. Private listening allows for more challenging music. When a user is in a social setting, especially with weak social connections, the music may need to be more approachable to satisfy a wider range of acceptability. A favorite song of a particular user may be inappropriate for certain occasions, or during certain mind-sets that the user experiences.

Figure 9:
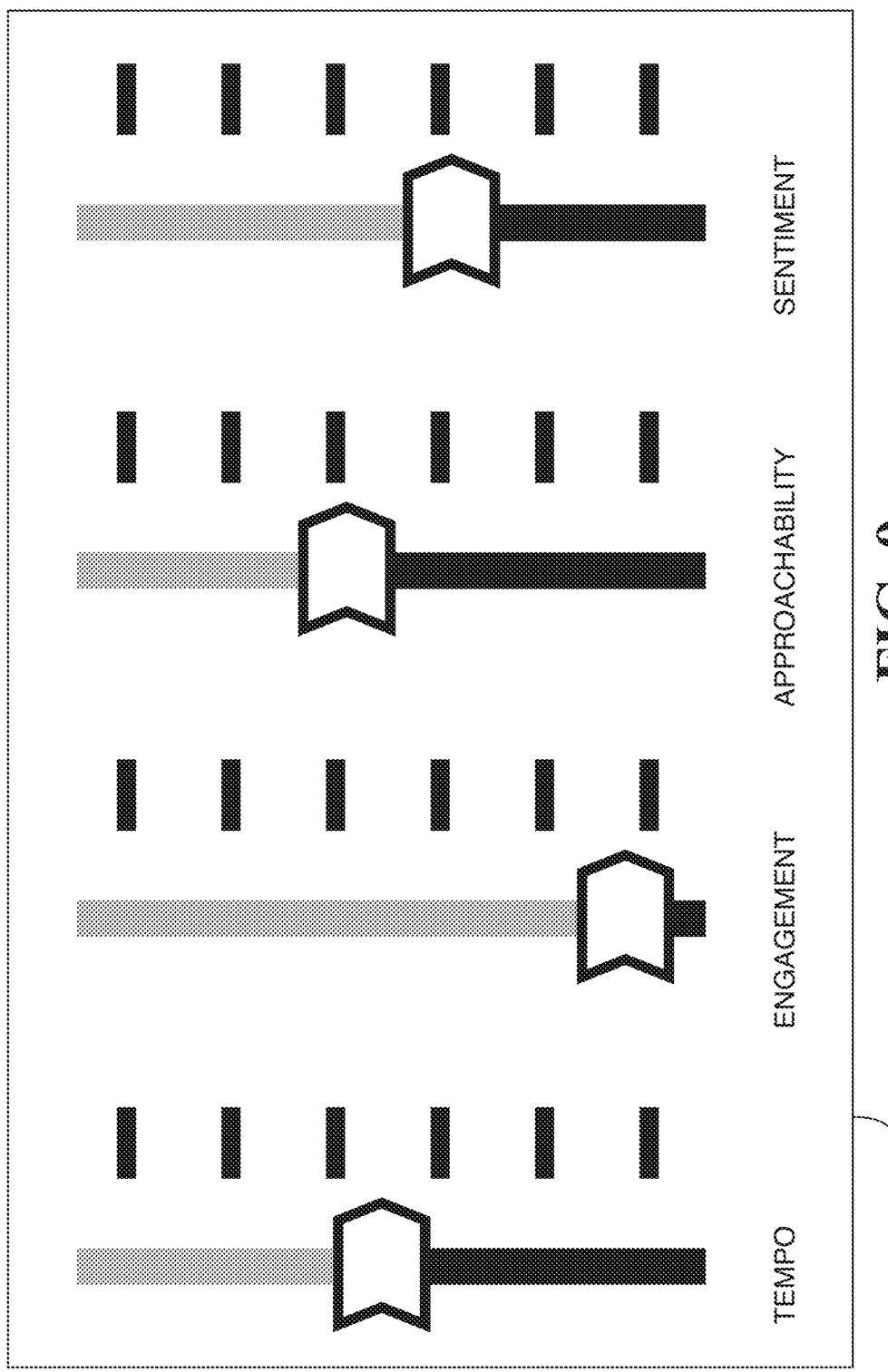
FIG. 9 is a diagram representatively illustrating other elements of the example music compilation method of FIG. 2.

An example will now be given of how the music analysis based on tempo, engagement, approachability, and sentiment works based upon different context. A music set for a long commute to work may, using the system 100, change going from normal highway travel to a traffic jam. On the highway during normal-speed driving, mid-tempo songs are useful to discourage speeding while keeping engagement low so that the traveler's mind can wander in a healthy way. Approachability can be varied based on the composition of passengers in the cabin and the sentiment may be low-key or neutral. These settings are represented by diagram 900 of FIG. 9.

Figure 10:
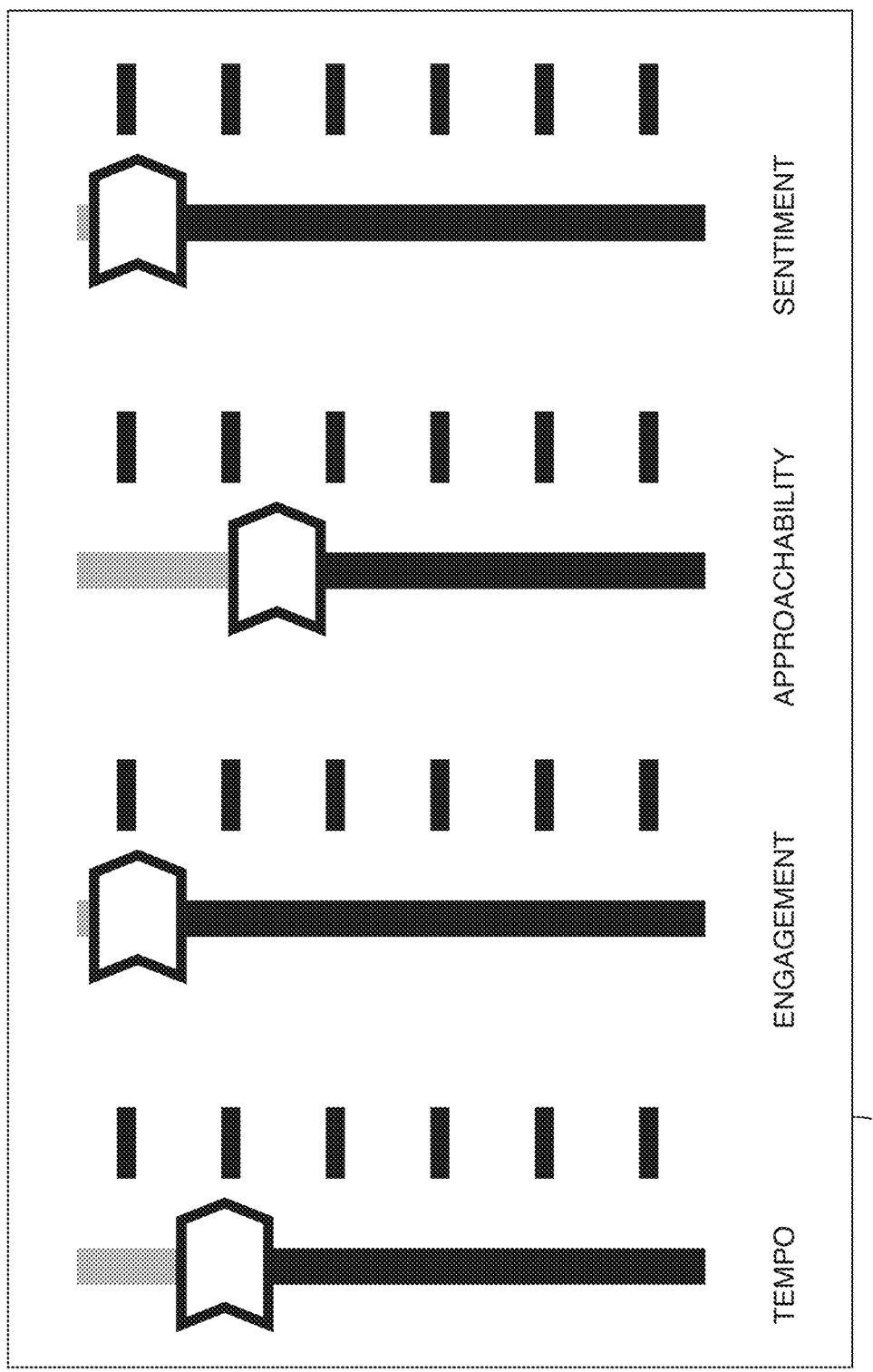
FIG. 10 is a diagram representatively illustrating other elements of the example music compilation method of FIG. 2.

FIG. 10, on the other hand, representatively illustrates how the system may respond to a sensed traffic jam (sensed for instance through mobile device or vehicle system GPS data). During the traffic jam the tempo goes up, the engagement switches from low to high, going from background music to lean forward music to distract the traveler from the frustrating road conditions, and the sentiment switches to positive and optimistic.

In essence, the set requirement stage defines the levels each of the four key song qualities (type of tempo, type of engagement, type of approachability, and type of sentiment) need to contain to qualify for any particular situation. For example, for a "Commute to work on highway" context, in implementations only those songs that are mid-tempo, low engagement, mid to low approachability (for a singular passenger) and mid sentiment will be considered, regardless of other criteria (like genre, era, etc.).

Music and Context Matching

Referring back to FIG. 2, the music and context matching step represents the system collecting songs that are deemed appropriate for the determined context, based on the prior song analysis. This step may be performed by one or more software applications or executables or by a software engine which may be termed the "Music and Context Matcher." The music and context matching step is akin to a DJ preparing for an event. Depending on the type of event and the anticipated audience, s/he picks different music, from his/her entire collection. The DJ may not know what to play until s/he gets to the event and gets a sense of the actual audience, so s/he will have more than what will actually be played in the handpicked subset that has been brought. Similarly, the system may select more songs than can actually be played in the allotted time, and mix them according to how the context changes or remains the same. Nevertheless, if the context changes, the system may dynamically do one or more additional context determination steps and redefine the set criteria while a set is already being played.

Set Catalog

The result of the music and context matching is the subset of the meta music catalog that includes only songs made available for mixing. In the case of a major streaming music catalog, the resulting subset of songs would still reach several thousand, if not even hundreds of thousands, titles for any scenario. This step may be thought of as an alternative genre classification. As indicated earlier, the music industry defines songs either according to genre (e.g., rock, jazz, country) or mood (such as "chill"). Instead, system 100 categorizes the music catalog according to the music listening occasion, like "Commute in car to work" or "Artistic Work at Ceramic Studio with multiple listeners." If the listener so chooses, s/he can then narrow the set catalog even further by specifying a specific genre, artists, or playlist, and conversely by excluding the same (this is the "Apply User Preferences" step).

Mixing the Set

The system 100 mixes the music set. This mixing may be done by a software engine implemented on one or more servers of the system and/or locally on device 118, and the software engine may be termed a "Turntabler." The system applies DJ-style tools and rules to the subset of appropriate songs identified for a set and then outputs a modified version of the songs. The Turntabler brings the artistry of a DJ to music streaming. It ensures that structure is added to the playlist, it progresses each set based on tempo and harmonic compatibility, and it determines where to mix the tracks, identifying the natural breaks in each song to smoothly transition.

The Turntabler's algorithm curates the right song order for each set. It determines when to bring the vibe up, when to subtly let the mood drop, when to bring the music to the forefront, when to switch the music to the background, when to calm and when to energize. It works seamlessly with all sensors and relevant data inputs of devices 118 and/or vehicles 122/124 or buildings 128/130 to know how whether the set has a particular duration (e.g., on a drive as determined via the GPS of device 118, at the gym as determined via the GPS of device 118, at home doing chores as determined via the GPS of device 118 and smart appliance input to the system through the telecommunications network) and when to switch the style. In implementations the Turntabler has the following functionalities.

Figure 11:
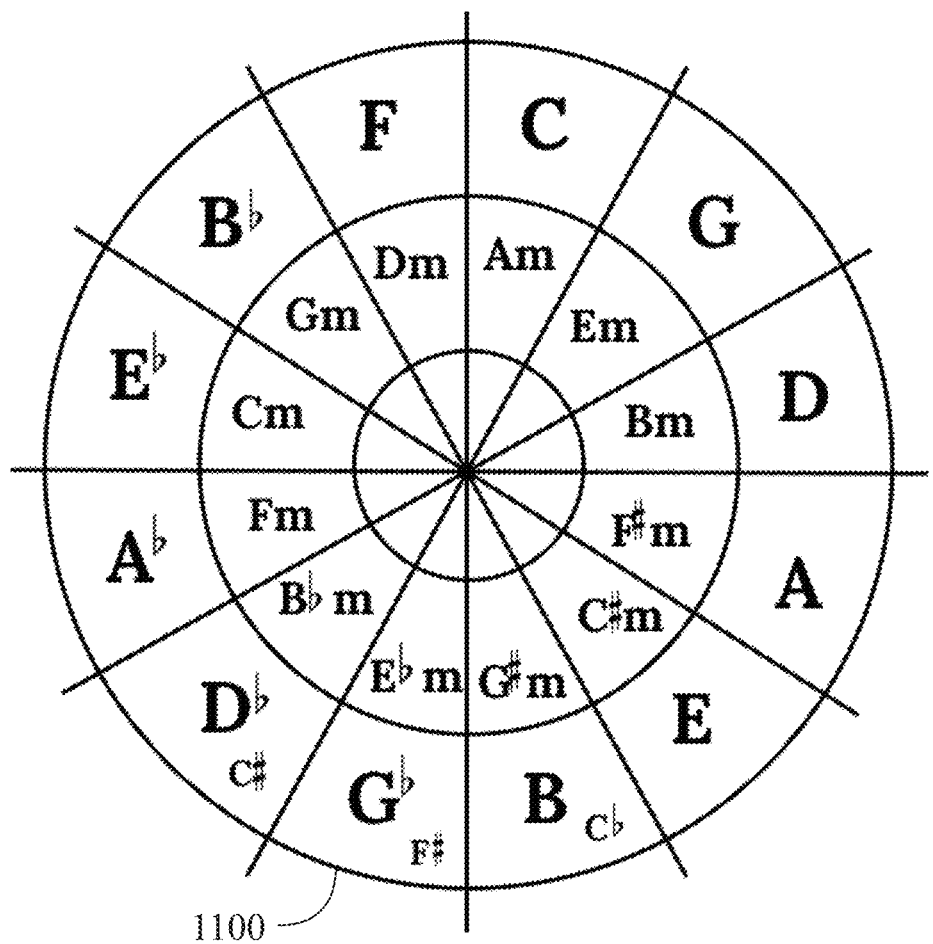
FIG. 11 is a diagram representatively illustrating other elements of the example music compilation method of FIG. 2.

Harmonizer—The Harmonizer identifies the key of each song to understand other harmonically compatible tracks. Like a professional DJ, the software will move around the key of the Wheel of Harmony (i.e., the circle of fifths 1100 represented in FIG. 11) and within the inner and outer wheels with every mix, progressing the soundtrack.

Figure 12:
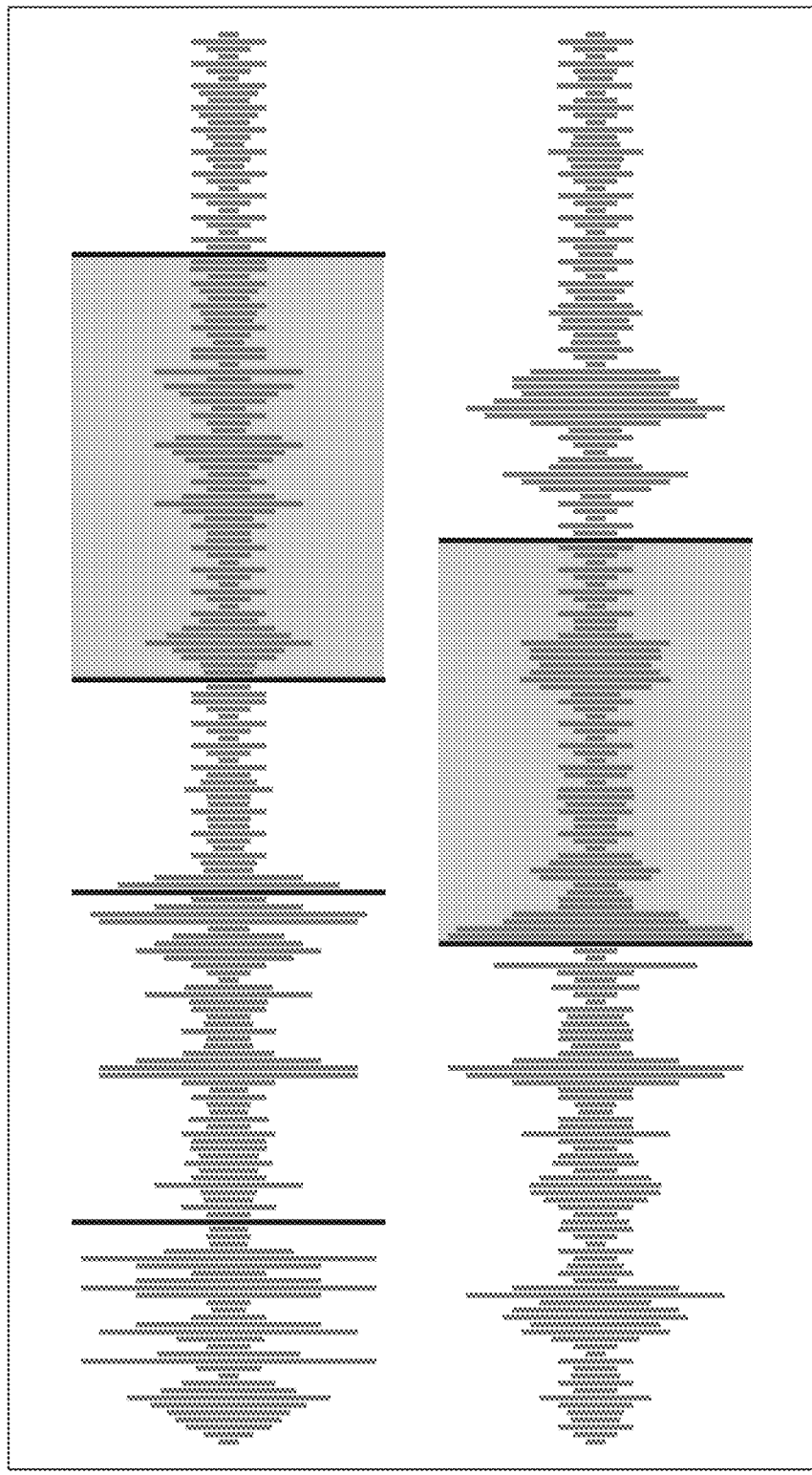
FIG. 12 is a diagram representatively illustrating other elements of the example music compilation method of FIG. 2.

Cross Fader—The Cross Fader determines the transition from one song to another during a set and is used together with the Beat Matcher (see below). One way that songs are mixed is to have a single song playing, bring a second song in so that both songs are playing simultaneously, and then fade out the first song so that only the second song continues. More songs may be added in as well (as opposed to layering only two songs). The Cross Fader utilizes a Cue Point feature to mark where to mix, identifying the natural breaks in each song to smoothly overlay them. It identifies particular times during a song that are best suited to transition (e.g., Where is the first beat? Where is the breakdown? Where do the vocals come in? In implementations Intros, Choruses, Breaks, Instrumentals, and Outros are the best sections to do a fade). Diagram 1200 of FIG. 12 representatively illustrates this, where sound profiles of a first track (top) and second track (bottom) are analyzed to determine the most likely places of each track (shown in gray) to implement a switch/fade from one track to the other.

Beat Matcher—The Beat Matcher aligns the beats of two or more songs, so that they are in sync. In order for the beats to be in sync, the songs must be playing at the same or at a compatible tempo (as determined by the songs' BPMs or Beats Per Minute) and the beats must be in phase—i.e., the rhythmic notes (bass drum, snare drum, etc.) occur at the same times.

Equalizer Mixing—This feature is especially useful when mixing different genres and eras. It utilizes Volume Fading and Vocal Blending by adjusting the frequency to create smoother transitions.

Looper—This feature creates its own break when a song does not have a long enough section to facilitate a smooth transition, or when you are running out of time at the end of a set (e.g., when the GPS suddenly shortens the ride time during a drive). The Looper will identify a 2 bars/8 beats section of audio as transition.

Pace Setter—This feature adds the nuanced "soft skills" of expert DJs to ensure that the set has deliberate momentum, pace and structure. Rules like "no three hits in a row," fluctuating energy ("warm up/main set/cool down"), add variety in genres and eras, the "push and pull" technique, "no repeating 8 (or 16) bars," "don't overdo the effects," etc., all add soul and gravitas to each set.

The Turntabler is a fully automated engine for mixing sets. While software exists to support musicians and DJs in mixing their own sets, these existing programs are disjointed and require manual supervision. The user has the option to use the Turntabler function context-free as well. If a user simply wants to mix a certain playlist (e.g., a personally compiled "Sunday morning" playlist), or the first four albums of R.E.M., the user can define a time frame (e.g., 30 minute set), Subset Library (e.g., includes all R.E.M. tracks and the "Nevermind" album from NIRVANA), and have the system 100 create a mixed set without considering contextual set requirements. This is especially useful for users who want to share their personal set lists, or for users at certain occasions (for instance, if a user simply wants to relax on the sofa and listen to 20 minutes of RADIOHEAD, sampled and mixed in tempo and harmony).

Figure 3:
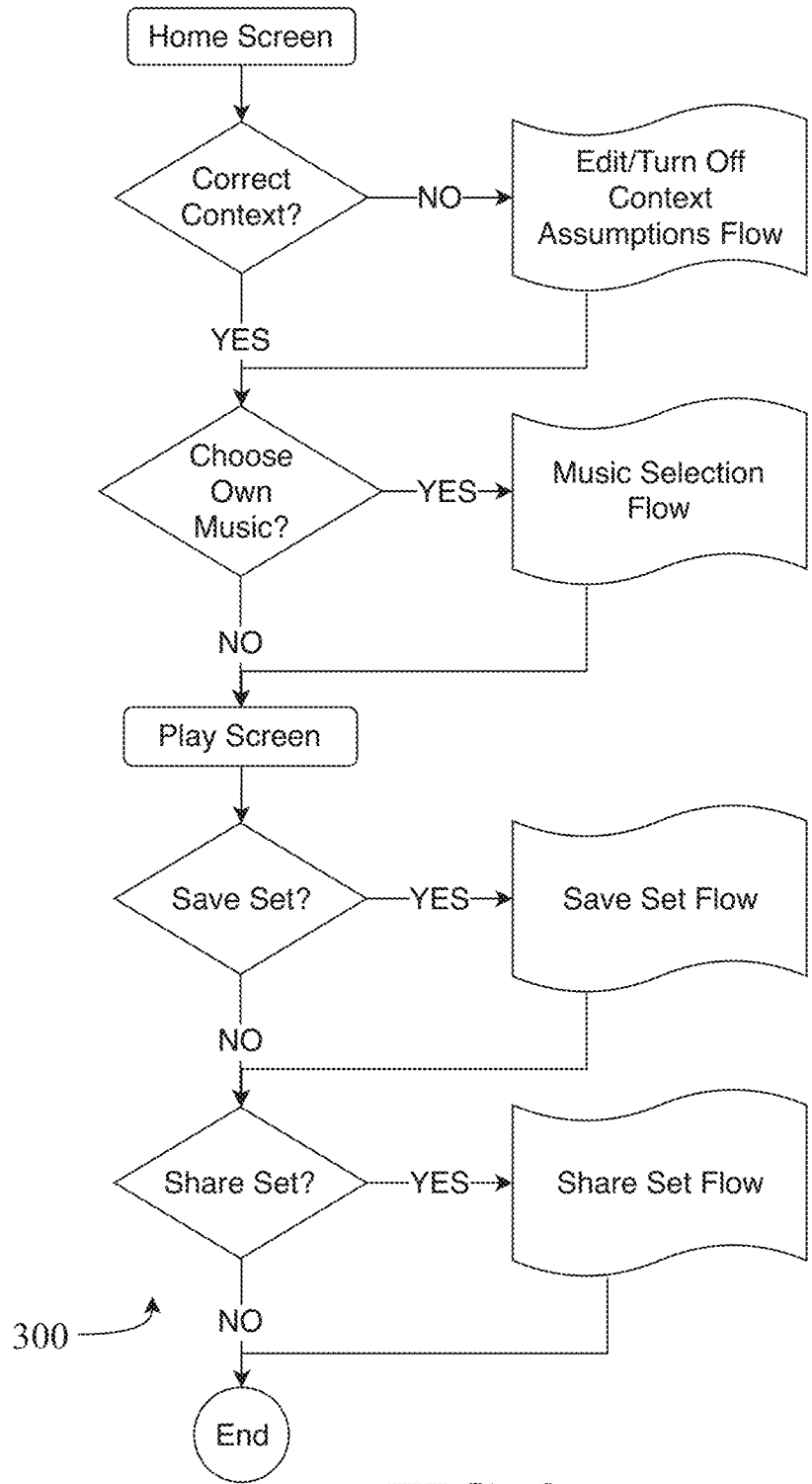
FIG. 3 is a flow diagram representatively illustrating other elements of the example music compilation method of FIG. 2.

Referring now to FIG. 3, a flow diagram 300 is shown which representatively illustrates various options for a user to implement using system 100 to affect the music compilation. These may be implemented, for example, using user interfaces 1300, 1400, 1500, and 1600 of FIGS. 13-16, which are displayed on display 120 of device 118. In implementation the music compilation is configured to occur automatically when a user presses a Play button (for example the Play button of interface 1300), so that when the user selects Play the appropriate mix for the occasion automatically starts.

Figure 13:
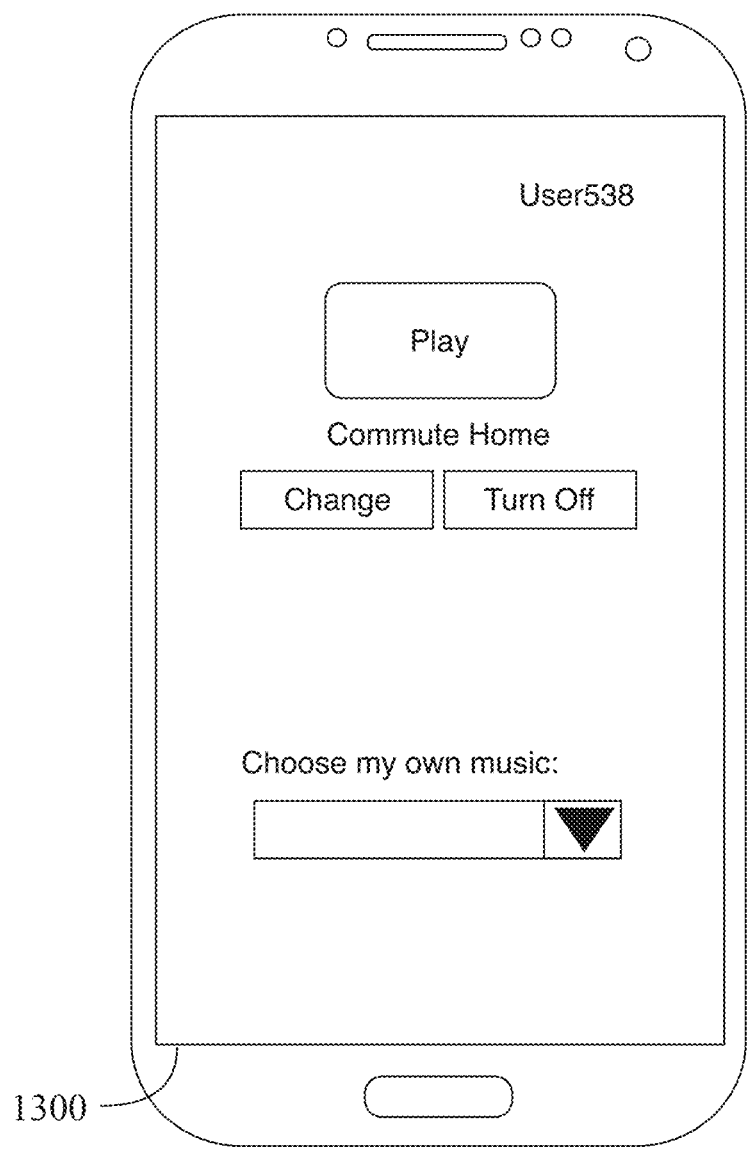
FIG. 13 representatively illustrates a user interface implemented using the system of FIG. 1.
Figure 14:
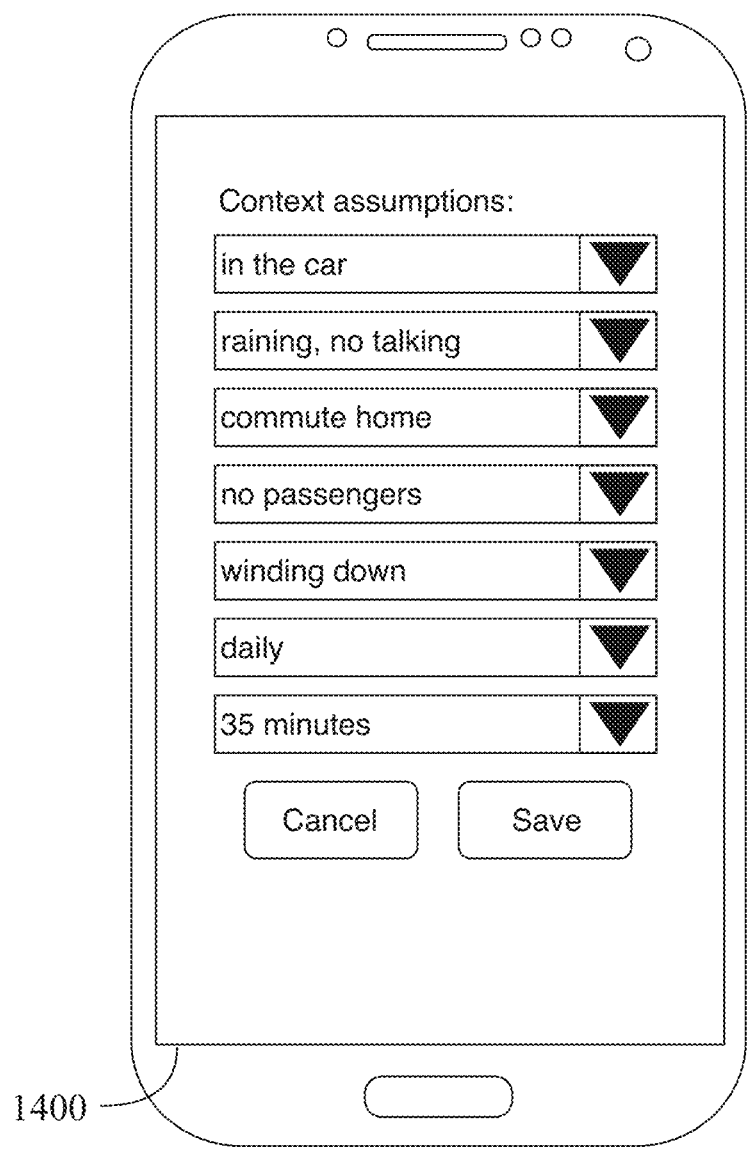
FIG. 14 representatively illustrates another user interface implemented using the system of FIG. 1.

However, the user has several options for modifying the music set. FIG. 3 shows that the first decision is whether the context is correct. FIG. 13 shows that the context selected for the user is "Commute Home." If this context is correct, the user can simply leave the music playing (or press Play to start the music, if Play has not already been selected). The user can at any time, however, select the Change selector to change the context manually. Alternatively, the user may select the Turn Off selector to turn off the context engine altogether (such as to have the system/app mix a specific mix-set, like one based on genre, a playlist, an artist, or an album, that is not determined by context) (in implementations the user may also specify music with the context engine on). The selectors described herein could have different names, for example the Turn Off selector could in other implementations be named the Ignore selector but accomplish the same function. In implementations when the user selects the Change selector a user interface such as interface 1400 of FIG. 14 is shown, which shows various algorithmic-selected context assumptions and allows the user to modify them. The topmost attribute is "type of space," which in the implementation shown is "In the car," the next attribute is "space conditions" which in the implementation shown is "raining, no talking," the next attribute is "intent" which in the implementation shown is "commute home," the next attribute is "social dynamic" which in the implementation shown is "no passengers," the next attribute is "state of mind" which in the implementation shown is "winding down," the next attribute is "regularity of the occasion" which in the implementation shown is "daily," and the last attribute is "time frame" which in the implementation shown is "35 minutes." The user may select any of these dropdown menus to change the algorithmically-selected defaults and then select the Save or Cancel selectors. In implementations the user interface may use selectors other than dropdown menus but with a similar selection function (the same goes for all other selectors described herein for the user interfaces, any type of selector now known or hereafter discovered may be used, and those shown in the drawings and described herein are only representative examples). The Cancel selector returns the user to the home screen (interface 1300) without making any changes, while the Save selector enacts the changes reflected on interface 1400 to adjust music play and returns the user to the home screen. In FIG. 3 the step of selecting either the Change or Turn Off selector (and, if the Change selector is selected, modifying the selections) is shown by the "Edit/Turn Off Context Assumptions Flow" step.

Referring again to FIG. 3, if the user elects to choose his/her own music then the music begins once the user selects Play (and the music is either selected based on context, if the context engine is on, or not based on context if the context engine is off). If the user selects not to choose his/her own music, then the music begins when the user selects Play (and again the music is either selected based on context, if the context engine is on, or not based on context if the context engine is off). Once Play is selected, the Play Screen is shown, which is representatively illustrated by interface 1500 of FIG. 15. This interface shows a set list. In the set list, artist and title information is displayed along with functions such as "Like" (up arrow), "Dislike" (down arrow), "Buy" which allows the user to purchase the track, and "Play" which allows the user to play any of the listed tracks immediately. The currently playing item in the list is visually distinct (in this case white background) from music previously played (dark grey background) and music that has yet to be played (light grey background). Audio controls are presented (in this case they are represented below the set list) and may include any number and variety of controls, in this implementation the example controls from left to right are Stop (represented by an X) to stop play and return the user to the home screen, Skip Back to play the previous track (represented by <<), Skip Forward to skip the currently playing track (represented by >>), Pause to stop play but stay on interface 1500 (represented by ||), Play to un-pause and start play again (represented by >), and repeat to play the current track one more time after it finishes (represented by a curved arrow symbol). Other audio controls could be included on interface 1500.

Figure 15:
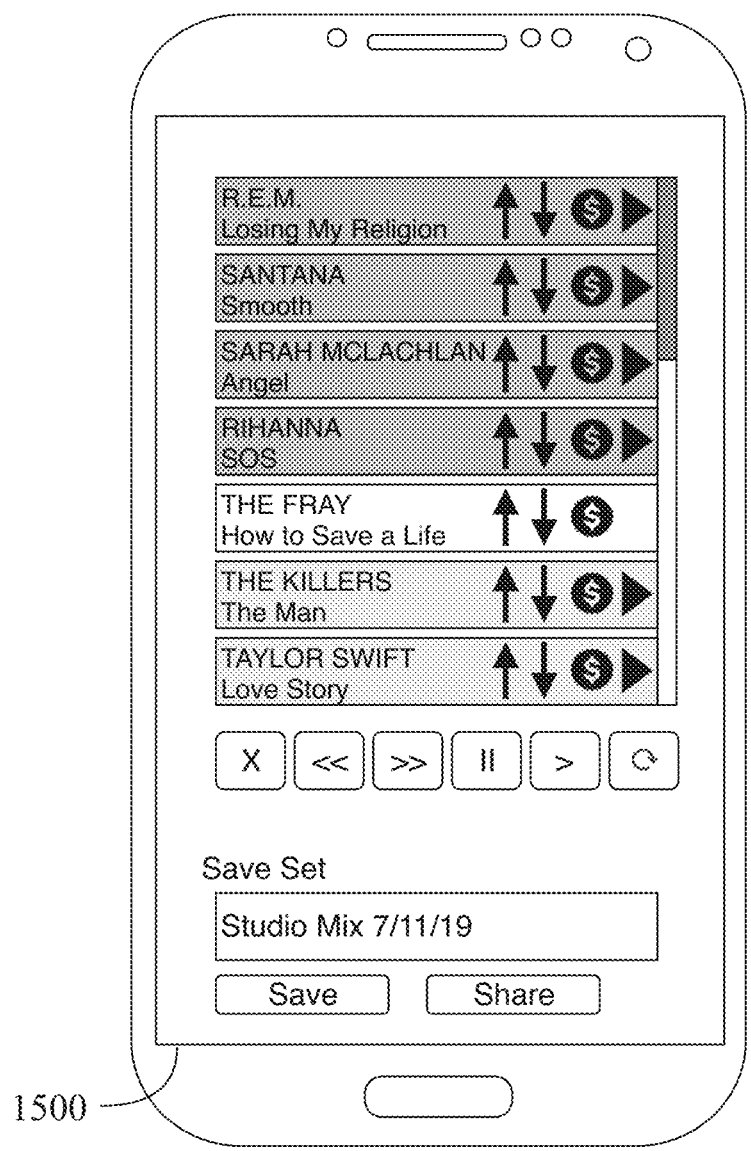
FIG. 15 representatively illustrates another user interface implemented using the system of FIG. 1.

Interface 1500 also shows a selector to save the set and a selector to share the set. In the flow diagram of FIG. 3 these are in the order of Save first and Share second, but this is only one example. In implementations the user could save a set and then share it, or share the set first and then save it, or the user could save the set and not share it, or share the set and not save it. In FIG. 15 a default name and date (defaulted to today's date) is provided by the system, but the user can select inside the name field to edit the name, such as with the device's built-in typewriter function. Selecting the Save selector will save this mix so that the user can play it at any later date. For example it may be one of the options available through the dropdown "Choose my own music" selector of interface 1300—which if played could default to play the set with the context engine off in the same order it was previously played or could be played with the context engine on to play the same songs but possibly mixed in different orders and ways based on context. Selecting the Share selector will bring up options to allow the user to share the set details with others through email, social media, text, and so forth. In implementations what is shared may be a link which invites the person to install the app to listen to the set or, if they have already installed the app, a link to begin playing the set. In other implementations what is shared may simply be a list of the artists and songs.

Finally, FIG. 3 shows an End after the user has saved and/or shared the set. In implementations, however, the user may save and/or share a set while the set is still playing, and the set may be dynamically added to if the context engine determines that the set should be added to (such as a commute or activity taking longer than originally expected). Additionally, in implementations if the user never selects Stop or Pause, the system 100 may simply keep the set going and dynamically alter the set as the context changes throughout a user's day.

Referring back to FIG. 13, it is also pointed out that the topmost user-selected name (User538) indicates a logged-in state. If the user selects the username by tapping it the user may be taken to an account screen (not shown) to modify user details, such as username, contact information, and other details. The "Choose my own music" selector may allow the user to choose based on genre, available music catalogs associated with the user (e.g., SPOTIFY, PANDORA, locally stored music, etc.). In the drop down menu/text field for choosing specific music the user could also enter a specific playlist, artist, album, or other input. The text field if typed in provides autocomplete options based on available music catalogs associated with the user.

Figure 16:
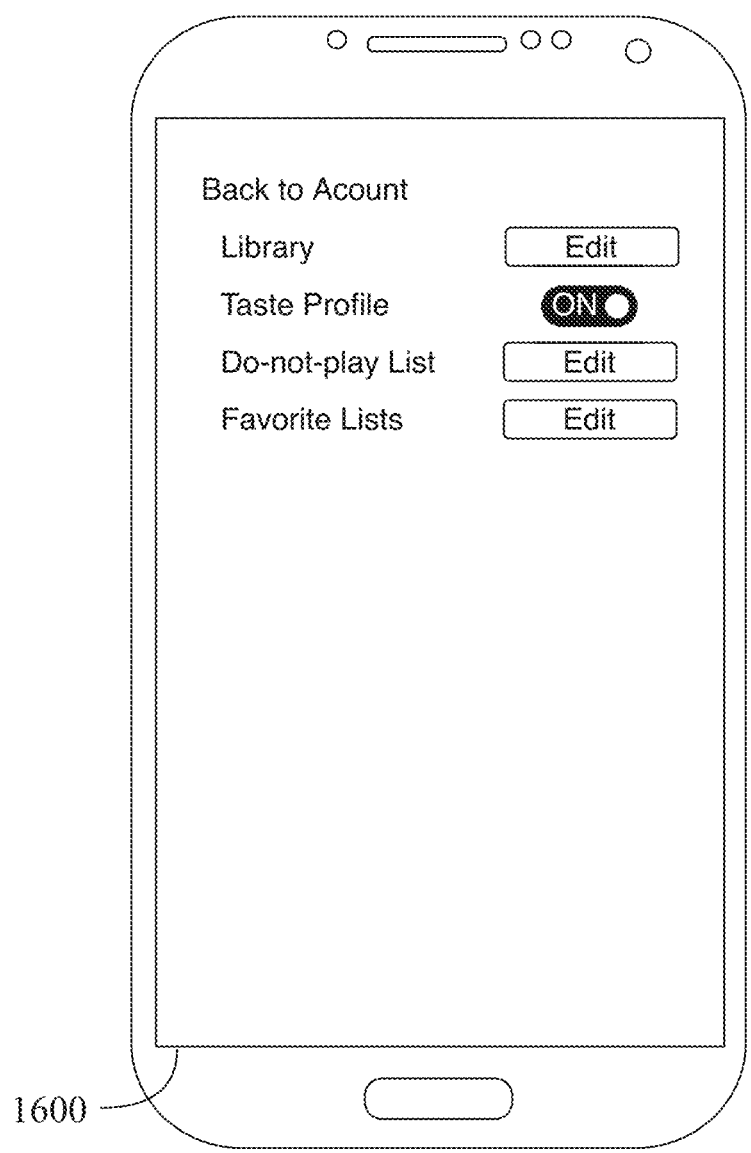
FIG. 16 representatively illustrates another user interface implemented using the system of FIG. 1.

FIG. 16 shows interface 1600 which may be accessed from an Account interface (not shown). Account set up may be fairly standard. The user creates an account and may add other subscription libraries (e.g., SPOTIFY, PANDORA) through credential verification and can add their personal library, this may be initiated for instance by selecting the Edit selector next to "Library" on interface 1600. Music libraries can also be added later, at any time after account setup. The Library "Edit" button brings up a screen that is not shown in the drawings but which allows the user to see the libraries/catalogs already associated with the account (e.g., SPOTIFY), add new libraries/catalogs to be aggregated into the Meta Music Catalog (e.g., PANDORA), and delete or disassociate (e.g., remove credentials for) libraries/catalogs that are currently included in the Meta Music Catalog.

In implementations Favorite lists (from which to mix) can be added as well. For instance, if a user has favorite genres, artists, albums or subscription playlists from which to mix, then they may be listed and/or edited using the Edit selector next to the Favorite Lists wording. Another feature is the "DO NOT PLAY" option. The user can choose to avoid specific genres, artists, songs, albums, eras, popularity levels, and so forth to not play. The user can furthermore choose to do so "always" or just "sometimes," and then specify further on which occasions to not play the specified choice. Popularity levels may be listed as "all," "top 80%," "top 50%," and "top 20%," with "top 80%" as the default option for this app. Popularity may be measured by numbers-of-play within the Meta Music Catalog. Cutting off the bottom 20% may help ensure that only professionally recorded songs will be available, yet ensure variety. An advanced setting allows the user to set conditions for the Do-not-play list (e.g., only during specific contexts).

While certain types of selectors have been described above, any type of selectors and fields common in mobile device apps may be utilized to implement the user interfaces while still maintaining the functionalities generally described herein. Taste profile is "On" by default, which means that the user agrees to let the system 100 analyze his/her Meta Music Catalog to identify preferences (e.g., preponderance of a particular genre or artist) and patterns (e.g., most played songs). The user may turn this off as desired. The user may view and edit his/her favorite sub-catalogs, similar to the functionality provided in the SONOS software application.

As has been pointed out to some extent above, the system and methods may be used to provide a listening experience that includes partial tracks. In some implementations the system may provide a compiled music set that includes only partial tracks, all mixed together so that transitions happen at appropriate times. In other implementations a compiled set may include only full tracks, or some full and some partial tracks. Music listening using the systems and methods described herein is, in implementations, more artistic, deep, meaningful, personalized, and intimate than the common linear streaming experiences of similar-sounding songs. In implementations in which the system creates a music set that is only partial tracks, it may be more accurate to call the set a "sample set" as opposed to a playlist—the system in such implementations is allowing the user to sample various tracks without listening to any track in its entirety, and in an intelligently mixed manner with useful transitions and transition points.

To recap some of the details of the systems and methods, the turntablism style results in the creative augmentation of any music catalog. It creates a new form of streaming music: a sequence of songs mixed together to appear as one continuous and seamless track. Not only is the outcome truly original, it is also true to the actual listening behavior of people since songs are often not listened to until completion. One SPOTIFY commissioned study found that the likelihood of a song being skipped in the first 5 seconds of play is 24.14%, and that the likelihood rises to 48.6%, before the song is finished (so that listeners skip, on average, every other song). The systems and methods disclosed herein (to make a compilation set of samples enhanced by DJ techniques and rules rather than a string of entire songs) will in implementations change the way people listen to music.

The contextual nature of the systems and methods, making the system aware of situations, social settings and surroundings, allows the system the ability to flexibly adjust in real time if contextual factors change. Comprehending the context for each listening occasion allows the app to develop an intimate relationship with the audience. Each set is achieved through a symbiotic relationship between the app, the audience, and the setting. Each set is shaped to match the particular occasion and curate the right song order and vibe progression. That makes the music play a contextualized experience. The system is like a virtual DJ who knows how to read a room and respond to its vibe.

The systems and methods are also dynamic. Some traditional streaming music services are linear and static, meaning the songs being played are all similar to each other, there being no structure to them other than generic theme. Songs in these traditional music services are randomly picked from a plurality of similar songs, making it unlikely that the music application always plays music suitable for the conditions of the listening occasion. In contrast, with the systems and methods disclosed herein the song progression is intentional and adaptive: songs are the building blocks of the sets and are chosen in relation to the relevant factors that define a particular situation.

Additionally, the systems and methods are largely automated so that music playback may occur with only the selection of the Play selector. This starts play of the set automatically once the situation is understood. No other prompts are needed (unless the listener wants to choose the option to specify certain artists, genres or playlists to mix).

The DJ-like elements of the system and methods disclosed herein bring artistry to music playback and add longitudinal structure to each set that does not exist in traditional music streaming services. The system and methods make the music listening more of an artform and a journey. They may allow for more diverse music sets, with more musical variety, while still seamlessly weaving the tracks together in a DJ-like style.

The interfaces of FIGS. 13-16, as described, may be implemented using a software app installed in a vehicle's infotainment system or on a mobile device such as a phone, tablet or the like. The system 100 may gather information in a variety of ways to know how to mix the set. For example, if the app is launched while computing device 118 is in an art studio the system may geo-detect that this is the location (using the mobile device's GPS capability). Attributes like length of play (of the entire set) would not apply in this scenario (unless there is a pattern to it, like a repeating hour-long class in the art studio every Thursday). Social dynamics can be detected by the amount of sound signals detected by the device's microphone. The more people are in the space, the more mainstream (approachable) the music may need to be. State of mind may also be gathered through sensors, for instance what tones are being used in conversation. Conditions may or may not apply. For example, heavy weather may cause the system to adjust sentiment. Pattern recognition, as described above, may adjust the set—for example of the visit to the art studio is for a class that is every Tuesday from 5 pm-7 pm then the set may be adjusted to last exactly two hours.

It is pointed out here that the systems and methods disclosed herein may in implementations include playing sample sets that include not only music that a user has previously listened to through the one or more third party music streaming services (or personal music library), but also music from those subscribed third party streaming services that the user has not previously listened to but which match with user preferences as determined by the system 100.

Music compilation systems and methods disclosed herein may include any details/aspects of music compilation/playback disclosed in the Parent applications.

In places where the phrase "one of A and B" is used herein, including in the claims, wherein A and B are elements, the phrase shall have the meaning "A or B." This shall be extrapolated to as many elements as are recited in this manner, for example the phrase "one of A, B, and C" shall mean "A, B, or C," and so forth.

In places where the description above refers to specific embodiments of music compilation systems and related methods, one or more or many modifications may be made without departing from the spirit and scope thereof. Details of any specific embodiment/implementation described herein may, wherever possible, be applied to any other specific implementation/embodiment described herein.

What is claimed is:

1. A music compilation system, comprising:
one or more first databases;
data stored in the one or more first databases associating a user with access credentials for a plurality of third party music streaming services;
one or more first servers communicatively coupled with the one or more first databases, the one or more first servers also communicatively coupled with a plurality of third party servers through a telecommunication network, each of the third party servers providing access to a music library associated with the user, each of the third party servers associated with one of the third party music streaming services;
a list stored in the one or more first databases listing audio tracks of the music libraries of the third party servers;
a computing device communicatively coupled with the one or more first servers through the telecommunication network; and
one or more user interfaces displayed on the computing device, the one or more user interfaces comprising:
a play selector configured to, in response to receiving a user selection, initiate play of a sample set using the computing device, wherein the sample set comprises portions of the audio tracks in the list;
wherein the system determines the portions of the audio tracks in the sample set based on contextual information gathered by the computing device, the contextual information not comprising any user selection.

2. The system of claim 1, wherein the sample set comprises multiple partial audio tracks each of which comprises only a portion of a full audio track.

3. The system of claim 1, wherein the one or more first servers are configured to determine, based on the contextual information, one or more of the following: a type of location in which the sample set is being played; a condition of the location; a purpose of an occasion for which the sample set is being played; a social dynamic at the location; a state of mind of the user; a regularity of the occasion; and a time frame.

4. The system of claim 1, wherein the list categorizes each audio track according to one or more of the following criteria: a tempo; an approachability; an engagement; and a sentiment.

5. The system of claim 4, wherein: the tempo is defined as beats per minute; the approachability is defined by one or more of chord progression, time signature, genre, motion of melody, complexity of texture, and instrument composition; the engagement is defined by one or more of dynamics, pan effect, harmony complexity, vocabulary range, and word count; and the sentiment is defined by one or more of chord type, chord progression, and lyric content.

6. The system of claim 1, wherein the system is configured to, in response to receiving the user selection of the play selector, automatically mix audio tracks by transitioning from a first audio track to a second audio track at portions of the two audio tracks that are similar in one or more of harmony, tempo and beat.

7. The system of claim 6, wherein the system is configured to automatically mix the audio tracks based on a determination made by the system of which portions of the two audio tracks are most similar in one or more of harmony, tempo and beat.

8. The system of claim 1, wherein the system determines, in response to the user selection of the play selector, a playback time for the sample set, wherein the playback time is not selected by the user but is based on the contextual information.

9. The system of claim 1, wherein the system is configured to repeatedly gather the contextual information using the computing device and, without receiving any user selection, modify the sample set based on a change in the contextual information.

10. A music compilation method, comprising:
providing one or more first databases;
using one or more computer processors, associating, in the one or more first databases, a user with a plurality of third party music streaming services;
providing one or more first servers communicatively coupled with the one or more first databases, the one or more first servers also communicatively coupled with a plurality of third party servers through a telecommunication network, each of the third party servers providing access to a music library associated with the user, each of the third party servers associated with one of the third party music streaming services;
using one or more computer processors, storing a list in the one or more first databases listing audio tracks of the music libraries of the third party servers;
using one or more computer processors, displaying a play selector on a user interface of a computing device communicatively coupled with the one or more first servers through the telecommunication network;
using one or more computer processors, in response to receiving a user selection of the play selector, initiating play of a sample set using the computing device, wherein the sample set comprises portions of the audio tracks in the list;
wherein the sample set is determined based on contextual information gathered by the computing device, the contextual information not comprising any user selection.

11. The method of claim 10, wherein the sample set comprises only partial audio tracks each of which comprises only a portion of a full audio track.

12. The method of claim 10, further comprising determining, using the one or more first servers, based on the contextual information, one or more of the following: a type of location in which the sample set is being played; a condition of the location; a purpose of an occasion for which the sample set is being played; a social dynamic at the location; a state of mind of the user; a regularity of the occasion; and a time frame.

13. The method of claim 10, further comprising displaying, on a user interface of the computing device, contextual determinations based on the contextual information, and displaying one or more selectors thereon allowing a user to modify the contextual determinations.

14. The method of claim 10, further comprising, using the one or more first servers, categorizing each audio track according to one or more of the following criteria: a tempo; an approachability; an engagement; and a sentiment.

15. The method of claim 10, further comprising, in response to receiving the user selection of the play selector, automatically mixing audio tracks by transitioning from a first audio track to a second audio track at portions of the two audio tracks that are similar in one or more of harmony, tempo and beat.

16. The method of claim 10, further comprising displaying an off selector on a user interface of the computing device and, in response to receiving a user selection of the off selector, ceasing from gathering the contextual information by the computing device and ceasing from determining the sample set based on the contextual information.

17. The method of claim 10, further comprising displaying a do-not-play selector on a user interface of the computing device allowing the user to make one or more selections to prevent one or more audio tracks in the list from being included in the sample set.

18. The method of claim 10, further comprising analyzing the music libraries of the user using the one or more first servers and storing in the one or more first databases, based on the analysis, one or more music preferences of the user, wherein the sample set is determined at least in part based on the one or more music preferences.

19. The method of claim 10, further comprising displaying, on a user interface of the computing device: audio track details of the sample set; a save selector allowing the user to save the sample set; and a share selector allowing the user to share the sample set.

20. A music compilation method, comprising:
providing one or more databases;
providing one or more servers communicatively coupled with the one or more databases;
using one or more computer processors, storing, in the one or more databases, a list of audio tracks;
using one or more computer processors, associating, through the one or more databases, a user with the list of audio tracks;
using one or more computer processors, in response to receiving a user selection of a play selector through a user interface of a computing device communicatively coupled with the one or more servers through a telecommunication network, initiating play of a sample set using the computing device, wherein the sample set comprises portions of the audio tracks in the list;
wherein the sample set is determined, using one or more computer processors, based on contextual information gathered by the computing device, the contextual information not comprising any user selection; and
wherein the sample set comprises multiple partial audio tracks each of which comprises only a portion of a full audio track.

\* \* \* \* \*